United States Patent
Serov et al.

(10) Patent No.: US 11,322,765 B2
(45) Date of Patent: May 3, 2022

(54) SMART-MEAS FOR HIGH POWER FUEL CELLS

(71) Applicants: Alexey Serov, Albuquerque, NM (US); Plamen B. Atanassov, Santa Fe, NM (US)

(72) Inventors: Alexey Serov, Albuquerque, NM (US); Plamen B. Atanassov, Santa Fe, NM (US)

(73) Assignee: UMM Rainforest Innovations, Albuquerque, NM (US)

( * ) Notice: Subject to any disclaimer, the term of this patent is extended or adjusted under 35 U.S.C. 154(b) by 55 days.

(21) Appl. No.: 15/557,843

(22) PCT Filed: Mar. 14, 2016

(86) PCT No.: PCT/US2016/022261
§ 371 (c)(1),
(2) Date: Sep. 13, 2017

(87) PCT Pub. No.: WO2016/149168
PCT Pub. Date: Sep. 22, 2016

(65) Prior Publication Data
US 2018/0053958 A1    Feb. 22, 2018

Related U.S. Application Data

(60) Provisional application No. 62/132,639, filed on Mar. 13, 2015.

(51) Int. Cl.
*H01M 8/1004* (2016.01)
*H01M 4/86* (2006.01)
(Continued)

(52) U.S. Cl.
CPC ......... *H01M 8/1213* (2013.01); *H01M 4/861* (2013.01); *H01M 4/8605* (2013.01);
(Continued)

(58) Field of Classification Search
CPC .......... H01M 4/86–861; H01M 4/8636–8642; H01M 8/10–124
See application file for complete search history.

(56) References Cited

U.S. PATENT DOCUMENTS

2004/0072061 A1* 4/2004 Nakano ................ H01M 4/926
502/339
2006/0204831 A1* 9/2006 Yan ..................... H01M 4/8642
429/483

(Continued)

FOREIGN PATENT DOCUMENTS

DE       102013207900 A1   10/2014
EP           0560295 A1     9/1993
(Continued)

OTHER PUBLICATIONS

T. Reshetenko, A. Serov, M. Odgaard, G. Randolf, L. Osmieri, A. Kulikovsky "Electron and proton conductivity of Fe—N—C cathodes for PEM fuel cells: A Model-based electrochemical impedance spectroscopy measurement" Electrochem. Comm. 118 (2020) 106795. DOI: doi.org/10.1016/j.elecom.2020.106795.

(Continued)

*Primary Examiner* — Jonathan Crepeau
*Assistant Examiner* — Jacob Buchanan
(74) *Attorney, Agent, or Firm* — Gonzales Patent Services; Ellen M. Gonzales

(57) ABSTRACT

Methods for optimizing, designing, making, and assembling various component parts and layers to produce optimized MEAs. Optimization is generally achieved by producing multi-layered MEAs wherein characteristics such as catalyst composition and morphology, ionomer concentration, and hydrophobicity/hydophilicity are specifically tuned in each layer. The MEAs are optimized for use with a variety of catalysts including catalysts with specifically designed and controlled morphology, chemical speciation on the bulk, (Continued)

chemical speciation on the surface, and/or specific hydrophobic or hydrophilic or other characteristics. The catalyst can incorporate non-platinum group metal (non-PGM) and/or platinum group metal (PGM) materials.

19 Claims, 16 Drawing Sheets

(51) Int. Cl.
  *H01M 4/88* (2006.01)
  *H01M 8/1213* (2016.01)
(52) U.S. Cl.
  CPC ....... *H01M 4/8636* (2013.01); *H01M 4/8642* (2013.01); *H01M 4/8828* (2013.01); *H01M 8/1004* (2013.01)

(56) References Cited

U.S. PATENT DOCUMENTS

| | | | | |
|---|---|---|---|---|
| 2007/0207374 A1* | 9/2007 | Shin | ............ | H01M 4/92 429/483 |
| 2007/0218342 A1* | 9/2007 | Han | ............ | H01M 4/8652 429/483 |
| 2008/0020261 A1* | 1/2008 | Hendricks | ............ | H01M 4/8636 429/431 |
| 2008/0032181 A1* | 2/2008 | Yamamoto | ............ | H01M 4/9083 429/480 |
| 2009/0053577 A1* | 2/2009 | Aotani | ............ | H01M 8/1004 429/481 |
| 2009/0239116 A1* | 9/2009 | Okumura | ............ | H01M 4/8642 429/513 |
| 2011/0159403 A1* | 6/2011 | Karulkar | ............ | H01M 4/861 429/487 |
| 2014/0261983 A1 | 9/2014 | Houghtaling | | |
| 2016/0064755 A1* | 3/2016 | Hubner | ............ | H01M 8/1004 429/413 |

FOREIGN PATENT DOCUMENTS

| | | |
|---|---|---|
| JP | 1993-251086 | 9/1993 |
| JP | 2001-519594 A | 10/2001 |
| JP | 2007-317658 A | 12/2007 |
| JP | 2011003420 A | 1/2011 |
| JP | 2012-533856 A | 12/2012 |
| WO | WO99-19066 A1 | 4/1999 |
| WO | 2007032903 A2 | 3/2007 |
| WO | 2011009124 A2 | 1/2011 |
| WO | WO2011-009124 A | 1/2011 |
| WO | WO-2013116754 A1 * | 8/2013 ......... H01M 8/1007 |
| WO | WO2014-177318 A1 | 3/2014 |
| WO | 2014164822 A1 | 10/2014 |

OTHER PUBLICATIONS

T. Reshetenko, G. Randolf, M. Odgaard, B. Zulevi, A. Serov, A. Kulikovsky "The Effect of Proton Conductivity of Fe—M—C-Based Cathode on PEM Fuel cell Performance" Journal of the Electrochemical Society 167 (2020) 084501.

T. Reshetenko, A. Serov, A. Kulikovsky, P. Atanassov "Impedance Spectroscopy Characterization of PEM Fuel Cells with Fe—NC-Based Cathodes" J. of the Electrochemical Society 166 (2019) F653-F660.

* cited by examiner

ORR 0.5M $H_2SO_4$

ORR 0.5M $H_2SO_4$

| Sample index | $I_d$ (A) | $I_r$ (A) | %$H_2O_2$ |
|---|---|---|---|
| 2 | $1.103e^{-3}$ | $1.2117e^{-5}$ | 4.9822 |
| 3 | $1.174e^{-3}$ | $1.41e^{-4}$ | 43.6654 |
| 4 | $1.359e^{-3}$ | $1.31e^{-4}$ | 36.6244 |
| 5 | $1.709e^{-3}$ | $1.35e^{-4}$ | 31.0391 |
| 6 | $1.424e^{-3}$ | $1.42e^{-4}$ | 37.6498 |
| 7 | $1.192e^{-3}$ | $1.428e^{-5}$ | 5.4210 |
| 8 | $1.275e^{-3}$ | $5.29e^{-5}$ | 17.5996 |
| 9 | $1.315e^{-3}$ | $1.329e^{-4}$ | 38.0611 |
| 10 | $1.297e^{-3}$ | $1.359e^{-4}$ | 39.1863 |
| 11 | $1.119e^{-3}$ | $4.866e^{-5}$ | 18.3682 |
| 12 | $1.186e^{-3}$ | $9.9136e^{-6}$ | 3.8135 |
| 13 | $1.202e^{-3}$ | $4.80e^{-5}$ | 16.9954 |
| 14 | $1.182e^{-3}$ | $1.356e^{-5}$ | 5.1972 |
| 15 | $1.187e^{-3}$ | $1.866e^{-5}$ | 7.0539 |

FIG. 10

| Sample index | $I_d$ (A) | $I_r$ (A) | $\%H_2O_2$ |
|---|---|---|---|
| 2 | $9.73e^{-4}$ | $1.2117e^{-5}$ | 8.7753 |
| 3 | $1.08e^{-3}$ | $1.41e^{-5}$ | 7.8212 |
| 4 | $1.097e^{-3}$ | $1.31e^{-5}$ | 10.6001 |
| 5 | $1.269e^{-3}$ | $1.35e^{-5}$ | 7.1054 |
| 6 | $1.312e^{-3}$ | $1.42e^{-5}$ | 7.9848 |
| 7 | $9.73e^{-4}$ | $1.428e^{-6}$ | 2.1820 |
| 8 | $1.067e^{-3}$ | $5.29e^{-5}$ | 6.1271 |
| 9 | $1.02e^{-3}$ | $1.329e^{-5}$ | 7.8844 |
| 10 | $1.131e^{-3}$ | $1.359e^{-5}$ | 6.8203 |
| 11 | $9.11e^{-4}$ | $4.866e^{-5}$ | 7.1103 |
| 12 | $9.80e^{-4}$ | $9.9136e^{-5}$ | 6.5273 |
| 13 | $9.56e^{-4}$ | $4.80e^{-5}$ | 9.8393 |
| 14 | $1.008e^{-5}$ | $1.356e^{-5}$ | 7.7641 |
| 15 | $1.049e^{-5}$ | $1.866e^{-5}$ | 6.0623 |

FIG. 15

| Sample Index | BET Surface Area (m²/g) |
|---|---|
| 2 | 637.4908 |
| 3 | 621.1008 |
| 4 | 554.4512 |
| 5 | 715.2203 |
| 6 | 740.7609 |
| 7 | 565.3260 |
| 8 | 604.6259 |
| 9 | 650.4011 |
| 10 | 768.9443 |
| 11 | 504.1002 |
| 12 | 659.5026 |
| 13 | 569.6509 |
| 14 | 574.8084 |
| 15 | 620.1910 |

SMART-MEAS FOR HIGH POWER FUEL CELLS

CROSS-REFERENCE TO RELATED APPLICATIONS

The following application claims benefit of U.S. Provisional Application No. 62/132,639, filed Mar. 13, 2015, which is hereby incorporated by reference in its entirety.

BACKGROUND

As Polymer Electrolyte Membrane Fuel Cells (PEMFCs, both proton exchange and anion exchange types) become a more viable option for clean energy production, cost is a major concern. Currently platinum contributes to over 40% of the total cost of a PEMFC. Because of this, there has been a huge push to develop non-platinum group metal (non-PGM, alternatively called platinum free catalysts) catalysts. One rapidly developing class of non-PGM catalysts for oxygen reduction reaction (ORR) are nanomaterials based on transition metal-carbon-nitrogen networks (M-N—C). These M-N—C non-PGM catalysts are made from a non-platinum group metal precursors and nitrogen-containing organic molecules.

PEMFCs, Electrolyzers and Electrochemical Reactors often use Membrane Electrode Assemblies (MEAs), which utilize a polymer ion exchange membrane (proton exchange or anion exchange membranes) to physically and electrically separate the gas diffusion electrodes (GDE) such as cathode from the anode. The PEM (polymer electrolyte membrane) is typically a fluoropolymer proton permeable but electrically insulating barrier, which allows the transport of protons from the anode to the cathode but forces the electrons to travel around a conductive path to the cathode. Anion exchange types of membrane may have a quaternary ammonium and phosphonium anion exchange group with different polymeric backbones.

Because the performance of non-PGM catalysts is typically lower than platinum metal group catalysts, it is desirable to find ways to increase the performance of non-PGM catalysts. While it has been shown that increased performance can be achieved by designing optimized catalysts, it should also be possible to increase performance by optimizing the design of the entire MEA.

The conventional manufacturing of MEAs is based on deposition of a specific ink formulation (comprising a mixture of the catalyst, ionomer, and solvent) either on the surface of a membrane (catalyst coated membrane, CCM) or on a gas-diffusion layer of substrate (catalyst coated substrate, CCS). However, because only a single ink formulation is used, the standard fabrication method results in an excess of ionomer close to the gas diffusion layer (GDL) and a low concentration of ionomer on the membrane. As a result, the performance of the MEA is low and durability issues occur.

Accordingly, novel methods for manufacturing MEAs with higher performance and durability are desired.

SUMMARY

The present disclosure provides methods for optimizing, designing, making, and assembling various component parts and layers to produce optimized MEAs. Optimization is generally achieved by producing multi-layered MEAs wherein characteristics such as catalyst composition and morphology, ionomer concentration, and hydrophobicity/hydophilicity are specifically tuned in each layer. The MEAs are optimized for use with a variety of catalysts including catalysts with specifically designed and controlled morphology, chemical speciation on the bulk, chemical speciation on the surface, and/or specific hydrophobic or hydrophilic or other characteristics. The catalyst can incorporate non-platinum group metal (non-PGM) and/or platinum group metal (PGM) materials.

BRIEF DESCRIPTION OF THE DRAWINGS

FIG. 10 is a table showing Performance characteristics extracted from the RDE data of FIGS. 6-9.

FIG. 15 is a table showing performance characteristics extracted from the RDE data of FIGS. 11-14.

DETAILED DESCRIPTION

The present disclosure provides methods for optimizing, designing, making, and assembling various component parts and layers to produce optimized MEAs. Optimization is generally achieved by producing multi-layered MEAs wherein characteristics such as catalyst composition and morphology, ionomer concentration, and hydrophobicity/hydophilicity are specifically tuned in each layer. The MEAs are optimized for use with a variety of catalysts including catalysts with specifically designed and controlled morphology, chemical speciation on the bulk, chemical speciation on the surface, and/or specific hydrophobic or hydrophilic or other characteristics. The catalyst can incorporate non-platinum group metal (non-PGM) and/or platinum group metal (PGM) materials.

Figure 1:
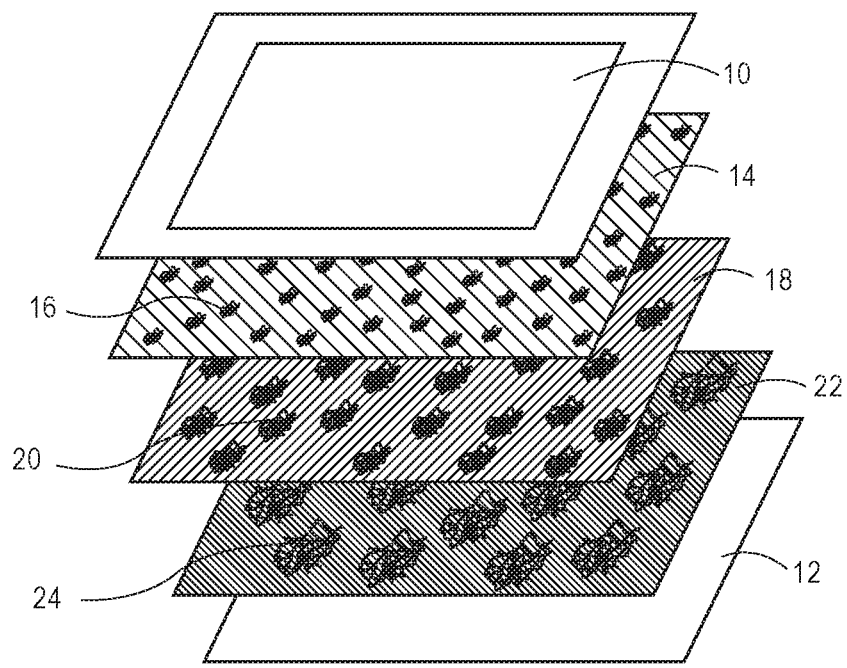
FIG. 1 is a schematic illustration of a smart membrane electrode assembly (MEA) according to an embodiment of the present disclosure.

According to a first embodiment, the present disclosure provides multi-layered MEAs wherein various aspects such as catalyst composition and morphology, ionomer concentration, and hydrophobicity/hydrophilicity are specifically tuned or controlled and may differ from layer to layer, these multi-layered MEA are referred to herein as "smart-MEAs." For example, an exemplary smart-MEA as shown in FIG. 1, may include a gas diffusion layer (GDL) 10 and a membrane 12. Between the GDL and the membrane is: a first catalytic layer 14 comprising a first embodiment of a catalytic material 16 mixed with a first ionomer and buffer at a first ionomer concentration (indicated by cross-hatching); a second layer 18 comprising a second embodiment of a catalytic material 20 and the first or a second ionomer and buffer at a second ionomer concentration; and a third layer 22 comprising a embodiment of a catalytic material 24 and a first, second or third ionomer and buffer at a third ionomer concentration, etc. Of course it will be understood that according to some deposition techniques, the buffer is removed during or after deposition and the catalytic layers may thus include only the catalytic material and the ionomer. It will also be understood that FIG. 1 is provided as a non-limiting example and that while three catalytic layers are depicted, the present disclosure contemplates embodiments incorporating only two catalytic layers or more than three catalytic layers including embodiments with four, five, six, seven or more catalytic layers. In general, and as explained in greater detail below, the layers are differentiated based on their composition of catalytic material, ionomer, and/or presence or absence of an additive.

In general, various non-limiting embodiments of the present disclosure enable the production of one or more gradients across the MEA which enable, encourage or discourage specific behavior within the MEA. For example, a gradient based on hydrophobicity/hydrophilicity, surface area or both can encourage water movement in one direction or another (i.e. towards or away from a membrane, as desired). Alternatively or additionally, the various ionomer concentrations may produce a gradient whereby the concentration of ionomer is gradually increased in one direction (i.e. the highest amount of ionomer may be found in the layer that is closest to the ion exchange membrane and the lowest concentration of ionomer may be found in the layer that is closest to the gas diffusion layer). A gradient based on ionomer concentration may be used to balance the needs of reducing pore blockage, where needed, facilitating the access of oxygen from the gaseous phase towards the catalytic layer and the withdrawal of water from the catalytic, in the case of proton-exchange membrane fuel cells and in the reverse direction in the case of anion-exchange membrane fuel cells, while still providing needed ionic conductivity and maintain the requisite transport properties.

It will, of course, be understood one or more of the layers may also include other elements including, for example, secondary catalysts, carbon nanotubes or other carbon particulate matter, surfactants for better dispersion, pore forming agents, conductive additives, and additives which will modify hydrophobicity and hydrophilicity, and that inclusion and/or the concentration and/or morphology of these other elements may also vary from layer to layer and may or may not produce a gradient.

As a specific exemplary embodiment, a smart-MEA optimized for use with a Proton Exchange Membrane (PEM) may be formed as follows:

Layer 1 (closest to membrane) contains 0.5 mg cm$^{-2}$ of low surface area catalyst (300-400 m$^2$ g$^{-1}$) in 50 wt. % ionomer. This formulation prevents possible blockage of pores which can occur when high ionomer concentrations are present near the PEM and increases the integration of the catalyst to the surface of membrane.

Layer 2 contains 1 mg cm$^{-2}$ of high surface area catalyst (600-700 m$^2$ g$^{-1}$) in 40 wt %, ionomer.

Layer 3 contains 2 mg cm$^{-2}$ of high surface area catalyst (600-700 m$^2$ g$^{-1}$) in 30 wt %, ionomer.

Layer 4 contains 0.5 mg cm$^{-2}$ of very high surface area (1100-1400 m$^2$ g$^{-1}$) in 20 wt %, ionomer and 20 wt % PTFE. According to some embodiments, it may be desirable for the layer closest to the GDE (which in this particular example is the fourth and final layer) to have a high surface area which is similar in range to the surface area of the Microporous Layer (MPL) of the GDE in order to have the same water management functions. The addition of PTFE to this layer results in effective removal of water from the overall catalytic layer, essentially creating a water-pump where the water flows from the PEM (where water is formed on the triple-phase boundary) towards the hydrophobic part of the GDL, where water will then travel to the fuel cell exhaust.

As a second specific exemplary embodiment, a smart-MEA optimized for use with an Anion Exchange Membrane (AEM) may comprise the following layers:

Layer 1 (closest to membrane) contains 2.5 mg cm$^{-2}$ of medium surface area catalyst (500-600 m$^2$ g$^{-1}$) in 35 wt. % ionomer. The catalytic material included in this layer may additionally be treated with 1M KOH to make it hydrophilic. In this design, hydrophilicity in the first layer is desirable in order to supply water through the AEM to the anode material, where it will then travel to the fuel cell exhaust.

Layer 2 contains 1 mg cm$^{-2}$ of high surface area catalyst (700-900 m$^2$ g$^{-1}$) in 40 wt %, ionomer.

Layer 3 contains 0.5 mg cm$^{-2}$ of very high surface area (1100-1400 m$^2$ g$^{-1}$) in 20 wt %, ionomer. As with the example above, this last layer may have a high surface area which is in the range of the surface area of the Microporous Layer (MPL) of GDE in order to have the same water management functions. However, in contrast to the proton exchange membrane example above, the anion exchange membrane example should have a water gradient which flows from the GDL to the membrane.

In general, the method involves producing, for each layer, an ink comprising the various desired components at the desire concentrations and depositing those inks, in the desired order, on the desired substrate (e.g., the GDL or membrane (PEM or AEM)).

According to an embodiment, each specialized ink layer may be deposited using any number of methodologies including dip-coating, painting, spraying (e.g., via an air brush), 3D printing, Doctor Blade method, digital printing, decal method, roll-to-roll continuous procedure, etc. According to some embodiments one or more layers may be deposited on one substrate, (e.g., the GDL) while one or more layers may be deposited on another substrate (e.g., the PEM or AEM).

As stated above, one of the factors that can be varied in the different layers is the composition, concentration, and morphology of the catalyst. For the sake of clarity, in the present application the term "catalyst" is used to refer to a final product, which catalyzes a desired reaction or reactions, including, for example, the type of electrocatalytic or chemical reactions required for use in various types of fuel cells, electrolyzers, CO$_2$ scrubbers, electrochemical reactors, wastewater reclamation plants, etc. The catalyst may include multiple types of materials, including, for example a catalytic material combined with an active or inactive supporting material. Catalysts which do not include or require a separate supporting material are considered to be unsupported or self-supported materials.

For the purposes of the present disclosure, the term "catalytic material" is any material which contains one or more active sites that enable catalysis or electrocatalysis. Examples of catalyzed reactions are electrochemical reactions; Oxygen Reduction Reactions (ORR), Oxygen Evolution Reactions (OER), hydrogen oxidation and reduction reactions (HOR and HER), alcohols oxidation catalysts, non-carbon based fuels oxidation catalysts, and chemical conversions such as hydrogenation/dehydrogenation, etc. The "catalytic materials" may consist of any active sites: precious, non-precious, platinum and platinum free sites.

For the purposes of the present disclosure, the term "active site' is used to describe chemical species on the surface of a catalyst/electrocatalyst and/or active support that participate in the catalyzed reaction. It will be understood that different types of active sites may use different types of catalytic pathways. For example, for electrochemical oxygen reduction some active sites follow a 4 electron (4 e$^-$) pathway, while others follow a 2 electron (2 e) pathway. The same concept can be applied to CO$_2$ conversion, HOR, HER, ammonia oxidation, alcohols electrooxidation etc.

It should be understood that according to some embodiments the catalytic materials may consist of unsupported catalysts without any carbon-based, non-carbon based, or other supports. In this case the morphology, chemical composition and other physical and chemical properties of catalyst itself can be modified, as desired, for integration into the various layers of the presently described Smart MEAs. Alternatively, some or all of the layers may contain supported catalytic materials. In this case the catalytic materials, the supports, or a combination thereof may vary between layers.

Figure 2:
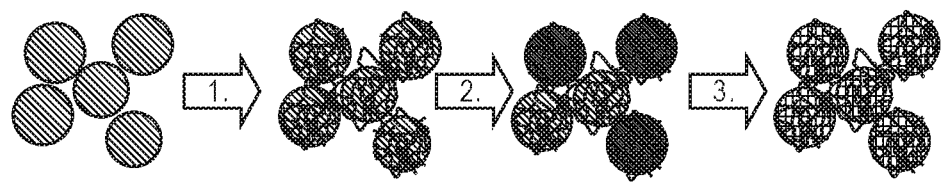
FIG. 2 is a schematic illustration of a sacrificial support based method of preparing catalytic materials according to the present disclosure.

According to one embodiment, the catalyst of the present disclosure may be or include a morphologically designed self-supported catalytic material formed using a sacrificial support based technique. For the purposes of the present disclosure, the terms "sacrificial support" or "sacrificial template" are interchangeable and intended to refer to a material that is included during the synthesis process in order to provide temporary structure but which is mostly or entirely removed by the end of the synthesis process. As demonstrated in FIG. 2, in the sacrificial support based technique, metal, nitrogen and carbon (M-N—C) precursors (squiggly lines) are allowed to interact with, for example by coating, infusing or otherwise mixing with) sacrificial template particles (circles) under suitable conditions such that a hybrid material containing the sacrificial template particles is formed (step 1). At step 2, the hybrid/template particle mixture is then subjected to heat treatment, such as pyrolysis, to form a rigid three-dimensional structure containing metal, nitrogen, carbon, and sacrificial template particles. At step 3, the sacrificial template particles are removed, resulting in a porous three-dimensional material wherein the pores are the voids that are produced by the removal of the template particles/aggregates/agglomerates.

For the purposes of the present disclosure, the term "precursor" is used to refer to one or more compounds which participate in an interaction by contributing one or more atoms to a compound that is formed as the product of the chemical/physical reaction or otherwise contributes to the formation of the product. For example in providing atoms or chemical moieties that help to create the chemical structure of the final product.

It will be appreciated that the present disclosure often makes reference to "M-N—C precursors." It should be understood that such terminology is used to refer to any single or group of precursors which, taken as a whole, contain suitable metal, nitrogen, and carbon atoms which are available for chemical synthesis and, at least some of which, are incorporated into the final product. Accordingly, an "M-N—C precursor" may refer to a metal-nitrogen-and-carbon-containing precursor; or to a metal-containing precursor and a nitrogen-and-carbon-containing precursor; or a metal-and-nitrogen-containing precursor and a carbon-containing precursor; or a metal-and-carbon-containing precursor and a nitrogen-containing precursor; or a metal-containing precursor, a nitrogen-containing precursor, and carbon-containing precursor, so long as the metal, nitrogen, and carbon, are available for chemical synthesis.

It should be understood that the catalytic material need not necessarily be limited to M-N—C catalysts, but may further include M-X—C catalytic materials where X may comprise or consist of different heteroatomic structures, including where the heteroatom can be: boron, phosphorus, sulfur, selenium, tellurium, oxygen, silicon etc. Accordingly, it will be understood that while much of the disclosure and examples may discuss or refer to M-N—C precursors or M-N—C catalysts, the teachings of the present disclosure are equally applicable to other M-X—C precursors or catalysts.

According to an embodiment, the M-X—C precursors of the present disclosure typically include exclusively or inclusively compounds containing heteroatom, carbon and metal precursors (including platinum group metals). Suitable heteroatom and carbon containing compounds include, for example, metal free pyridines, porphyrins and metal-containing porphyrin and pyridine-containing macrocycles including, but not limited to, N-Phenyl-1-naphthylamine, Melamine, 4-Amino antipyrine, Poly(acrylamide-co-diallyldimethylammonium chloride), Poly(2-ethyl-2-oxazoline), Niclosamide. Pyrazinecarboxamide, Quinine hydrochloride dehydrate, Ricobendazole, Streptomycin sulfate salt, Succinylsulfathiazole, Sulfacetamide, Sulfachloropyridazine, Sulfadiazine, Sulfaguanidine, Carbadox, Chlorhexidine diacetate salt hydrate, Chloroquine diphosphate salt, 6,9-Diamino-2-ethoxyacridine-DL-lactate monohydrate, Diethylcarbamazine citrate salt, Furazolidone, etc. Exemplary characteristics which may be examined with regard to the selection of the heteroatom, carbon, or heteroatom-carbon precursors used for producing the catalysts as described herein include, but are not limited to: (1) carbon richness; (2) heteroatom richness; and (3) thermal stability, i.e. the volatility of the molecules and resistance to decomposition due to heating. The degree of carbon richness is related to the porosity of the final product. For example, according to some embodiments, a porous, open-frame matrix will be formed if each molecule of the carbon precursor contains, on average, at least 5 carbon atoms. Depending on whether the plan is to perform synthesis in an inert or heteroatom-rich environment, the heteroatom richness of the precursor may need to be taken into account. For example, if synthesis is to be performed in an inert atmosphere, the precursor must have a substantial amount of heteroatom, since all the M-$X_x$ centers must be formed from heteroatoms contained in the precursor itself. Finally, precursors should be chosen which will remain stable under the thermal conditions to be used. For example, if the methodology to be used requires pyrolysis at a temperature of above 400° C. (a minimum temperature frequently required for active-site formation), it is important that the precursor remain stable at temperatures above 400° C.

According to a specific embodiment, the one or more metals used in the material are selected from the group consisting of transition metals. In general, transition metals are identified as the 38 elements in groups 3 through 12 of the periodic table. Suitable, exemplary transition metals include Fe, Ce, Cr, Cu, Co, Mo, Ni, Ru, Pd, Pt, Ir, Rh, Os, Ag, Au, Re, Ta, Ti, V, W, Mn, Zn, Sn, Sb, In, Ga, Bi, Pb, and Zr. (It will be noted that while many of the examples herein refer to the use of specific transition metals, other transition metals, including any of those identified above, can be substituted in place of the identified element, by simply using precursors of those metals instead. Examples of transition metal precursors include, but are not limited to manganese nitrate, manganese sulfate, manganese acetate, manganese chloride, iron nitrate, iron sulfate, iron acetate, iron chloride, cerium nitrate, chromium nitrate, copper nitrate, ammonium molybdate, nickel nitrate, ruthenium chloride, tantalum isopropoxide, titanium ethoxide, vanadium sulfate, ammonium tungstate and zirconium nitrate and chlorides, acetates, sulfates of any transition metals from the group mentioned above. Furthermore, as evidenced by the data in the example section below, according to some embodiments the presently described methodologies may utilize precursors of two or more metals to produce multi-metallic or multi-heteroatomic materials.

Of course, it will be understood that various different catalytic materials can be prepared by simply varying the specific M-N—C precursors and/or their ratios. Accordingly, a first catalytic material incorporating a first transitional metal could be formed for use in a first MEA layer, while a second catalytic material incorporating a second transitional metal could be formed for use in a second MEA layer, and so forth. It will be understood that each layer could include a catalyst have a different metal composition, or some layers could have the same or similar layers.

Of course it will be appreciated that given the temperatures that the sacrificial template will be subjected to during the synthesis method, it is important to select a template material which is non-reactive to the catalytic materials under the specific synthesis conditions used and the removal of which will not damage the active sites. Silica (magnesia, clay, zeolites, titania etc) are materials which are known to easily withstand the conditions described herein while remaining inert to the catalytic materials described and which can be removed using techniques that are harmless to the active sites. Materials such as these are referred to herein as Sacrificial Support ("SS") material. It will be understood that sacrificial template particles can be made from any suitable SS material. Of course, while many of the examples herein utilize silica for the templating materials, it will be appreciated that other suitable materials may be used including, but are not limited to, zeolites, alumina, and the like.

It will be appreciated that the size and shape of the template particles may be selected according to the desired shape(s) and size(s) of the voids within the final catalyst product. According to various embodiments, the template particles may take the form of any one, two- or three-dimensional regular, irregular, or indifferent shapes, including, but not limited to, spheres, cubes, cylinders, cones, etc. The particles may be monodisperse, or irregularly sized. Furthermore, the particles may or may not be porous and any pores may be of the same or different sizes and shapes. It will be understood that by selecting the particular size and shape of the template particles, one can produce an electrocatalyst having voids of a predictable size and shape. For example, if the template particles are spheres, the electrocatalyst will contain a plurality of spherical voids having the same general size as the spherical template particles. For example, in an embodiment where SS particles having an average diameter of 20 nm is used, the spherical voids in the electrocatalyst/catalyst will typically have an average diameter of approximately 20 nm. (Those of skill in the art will understand that if the diameter of the particle is 20 nm, the internal diameter of the void in which the particle resided will likely be just slightly larger than 20 nm and thus the term "approximately" is used to account for this slight adjustment.)

According to some embodiment the template particles may themselves be porous and the M-N—C precursors able to intercalate the pores in the template particles, leading to an even more complex final structure.

It will further be understood that the morphology of the catalysts can be altered not just by altering the size and shape of the sacrificial template particles, but also by altering the ratio of M-N—C precursors to sacrificial template particles. A higher sacrificial template particle to M-N—C precursor ratio might result in a less dense more mesh-like final structure, while a lower sacrificial template to M-N—C precursor ratio might result in denser more sponge-like structure. Accordingly, it will be understood that the final surface area of the catalytic material can be finely tuned by carefully selecting both the size and shape of the sacrificial template particles sacrificial template particle to M-N—C precursor ratio.

Accordingly, it will further be understood that various different catalytic materials may be produced with different morphologies including the size or shape of the voids as well as the surface area and density of the material. For example, the size and shape of the voids can be altered or selected by varying the size, shape, material, or composition of the sacrificial template particles between the different catalytic materials. For example, a first catalytic material having a first morphology (size or shape of voids, density, surface area, etc.) could be formed for use in a first MEA layer, while a second catalytic material having a second morphology could be formed for use in a second MEA layer, and so forth. It will be understood that each layer could include a morphologically different catalyst or some layers could have the same or similar layers.

As stated above, the sacrificial template particles and M-N—C precursors are allowed to interact under sufficient conditions that an M-N—C sacrificial template particle hybrid is created. This may be done, for example, by mixing the sacrificial particles and M-N—C precursors in a solvent or buffer or by using a mechanochemical synthesis technique such as that described below. An advantage of the mechanochemical synthesis-based methodology is that it does not require any solvents and thus can be used when one or more of the materials is hydrophobic or insoluble. Of course it will be appreciated that different layers of the MEA may incorporate catalytic materials that have been produced using the same or different techniques. Accordingly, an MEA may include a first layer incorporating catalytic materials that were formed by mixing sacrificial template particles in a solvent or buffer and a second layer incorporating catalytic materials that were formed using the below-described mechanochemical synthesis-based technique.

According to some embodiments, care may be taken to ensure that the sacrificial particles are dispersed relative to the M-N—C precursors. For example, sacrificial particles may first be dispersed in a buffer using, for example, a low-energy ultrasonic bath to form a colloidal solution. It will be appreciated that such dispersion of the sacrificial particles results in individual particles being separated from each other within the bath, thereby preventing the formation of a single monolithic block or several large clumps of sacrificial particles. It will be understood that the mechanochemical synthesis-based methods described below can also be designed to ensure appropriate dispersion of the sacrificial particles relative to the M-N—C precursors. Of course it will be understood that other methods for dispersing or otherwise separating the sacrificial particles so as to avoid the presence of monolithic blocks or clumps of particles could also be used including other methods for stirring or mixing the precursors and sacrificial template particles. It will also be understood that the degree of separation or clumping of the sacrificial particles can further be controlled by the methods of dispersion or mixing. It will similarly be understood that the different layers of the MEA may contain catalytic materials that have been formed with varying degrees of dispersion or clumping of the sacrificial particles.

As stated above, according to some embodiments, the interaction between the sacrificial template particles and M-N—C precursors may be promoted by use of a mechanochemical synthesis based method. According to a specific embodiment, the mechanochemical synthesis-based method may incorporate ball-milling. As stated above, according to this embodiment, ball-milling is used to enable mechanochemical synthesis, alleviating the need for solvent-based preparation methods. In general, the presently described mechanochemical synthesis-based method utilizes the energy produced by ball-milling of the various precursor materials and sacrificial template particles to drive a chemical reaction between the precursors. For the purposes of the present disclosure, the term "ball mill" is used to refer to any type of grinder or mill that uses a grinding media such as silica abrasive or edged parts such as burrs to grind materials into fine powders and/or introduce to the system enough energy to start a solid state chemical reaction that leads to the formation of the M-N—C sacrificial template particle hybrid.

As stated above, the M-N—C sacrificial template hybrid is then subjected to high temperature treatment in order to produce active sites and create a catalytic material. According to some embodiments, particularly embodiments wherein a single step synthesis method is used, optimal temperatures for heat treatment are typically between 500° C. and 1100° C. According to some embodiments, heat treatment may preferably be between 750° C. and 900° C., or more preferably between 775° C. and 825° C. In some embodiments, heat treatment of around 800° C. is preferred, as our experimental data showed this temperature to produce catalysts having a high amount of catalytic activity for certain specific materials (see experimental section below).

Heat treatment take place in either an inert atmosphere such as $N_2$, Ar, or He, or in a reactive atmosphere such as $NH_3$ or acetonitrile. Inert atmospheres are typically used when the infused materials are nitrogen rich, as the inert atmosphere enables the production of a high number of active sites with Fe (or other metal) N4 centers. However, it may be desired to use a nitrogen rich atmosphere if infused material is rich in carbon and depleted in nitrogen, as the nitrogen rich atmosphere will enable production of the Fe (or other metal) N4 centers. As described in greater detail in the experimental section below, according to some preferred embodiments, the materials of the present are subjected to heat treatment in a reactive atmosphere.

After heat treatment, the sacrificial support, if used, is removed using suitable means. For example, the sacrificial support may be removed via chemical etching. Examples of suitable etchants include NaOH, KOH, and HF. According to some embodiments, it may be preferable to use KOH, as it preserves all metal and metal oxide in the catalyst and, if the species are catalytically active, use of KOH may, in fact, increase catalytic activity. Alternatively, in some embodiments, HF may be preferred as it is very aggressive and can be used to remove some poisonous species from the surface of the catalyst. Accordingly, those of skill in the art will be able to select the desired etchants based on the particular requirements of the specific catalytic material being formed.

According to some embodiments, a second heat treatment step may be performed after removal of the sacrificial support. This second heat treatment step may produce additional active sites. In embodiments utilizing two separate heat treatment steps, it may be desirable for the different heat treatment steps to be conducted under different conditions, for example at different temperatures and/or for different durations of time. For example, the first heat treatment step may be performed at a higher temperature, such as 800° C. for 1 hr and the second heat treatment step may be performed at a temperature between 800 and 1000° C. for a period of time between 10 minutes and 1 hour.

Of course it will be understood that the different MEA layers may incorporate catalytic materials formed using different etchants, different heat treatment conditions and/or a different number of heat treatment steps.

Of course it should also be understood that some or all the MEA layers may incorporate catalytic materials that are prepared without using a sacrificial support method. For example, the layers may simply differ with regard to the size of the catalytic materials. in the way to tune their physical and chemical properties to have a gradient of desirable characteristics from layer to layer. For example Pt/C catalyst may be prepared by deposition of the smallest particles on the carbon support in the layer 1, which will be deposited on the GDE (Pt particles ~2 nm), layer 2 will have a Pt particles with size 4 nm, and layer 3 which will be deposited on the membrane will have particles 6 nm in diameter. Such gradient of Pt particles will increase the durability of Smart MEA, due to the fact that most corrosive environment in proton exchange fuel is on the triple phase boundary (membrane, ionomer and catalyst). So having larger particles there will increase the stability and overall durability.

As stated above, the same or different catalyst, some or all of which may or may not have been prepared using the techniques described above, can be mixed into a catalytic ink comprising the catalytic material, an ionomer, and, if needed, a solvent, surfactant or different additives. The ink can then be applied, spayed, painted, deposited (referred to herein inclusively and without ascribing a particular method of application with the term "deposited") to a surface (e.g., the GDL or the PEM) in order to produce a first MEA layer. A second MEA layer can be formed by depositing a second ink to a second surface (e.g., the membrane or GDL) or on top of the first layer. According to various embodiments, different MEA layers may be formed from inks having different ionomer concentrations, as in the example described above. For example, inks may be prepared comprising 5% or less ionomer, 10% ionomer, 20% ionomer, 30% ionomer, 40% ionomer, 50% ionomer, 60% ionomer, 70% ionomer, 80% ionomer, or 90% or more ionomer. In some cases it may be desirable to have a higher concentration of ionomer in layers that are closer to the membrane and a lower concentration of ionomer in layers that are closer to the GLD because water management requirements. Suitable types of ionomers include, but are not limited to, proton exchange—Nafion, anion exchange FumaTech, Tokuyama etc.

According to some embodiments, one or more of the MEA layers may further comprise additives including carbon additives such as carbon nanotubes (CNTs), carbon black, graphene, or carbon fibers, in order to increase permeability of reagents to the active sites of the catalyst and remove the products of electrochemical reactions. Of course it will be understood that the presence, concentration, or even morphology of the additive(s) could also be altered between different MEA layers. For example, a first layer might contain no carbon additives, while a second layer might include 5 wt % CNTs, and a third layer might include 20 wt % carbon black.

Accordingly, the present disclosure provides multi-layered MEAs wherein the MEA contains at least two catalytic layers wherein each layer is formed by applying a catalytic ink to a substrate or membrane, wherein the catalytic ink in the first layer differs from the catalytic ink in the second layer by at least one of: ionomer nature, ionomer concentration, ionomer molecular weight, catalytic material composition, catalytic material concentration, catalytic material morphology, catalytic material surface area, or the presence of an additive, nature of additives.

Of course it will be understood that the specific catalytic layer design will depend on the desired catalytic process (oxidation, reduction, conversion etc), ionomer and membrane type (proton exchange vs anion exchange), fuel cells vs electrolyzers, operating potentials and applications (automotive, combined heat and power, back-up systems etc).

The examples section below provides data related to a variety of different catalytic materials that were prepared by altering various aspects of the sacrificial-support based synthesis method described above. As shown, these alterations result in catalytic materials having different predictable and/or measurable characteristics which can then be used to design the various layers of the smart MEAS described herein. Accordingly, in the final example, a smart MEA was designed and tested based on the performance data gathered on the various prepared examples. As shown, the designed smart MEA outperformed a standard single layer MEA.

The terms and expressions that have been employed are used as terms of description and not of limitation, and there is no intent in the use of such terms and expressions to exclude any equivalent of the features shown and described or portions thereof, but it is recognized that various modifications are possible within the scope of the invention as claimed. Thus, it will be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

Examples

Figure 3:
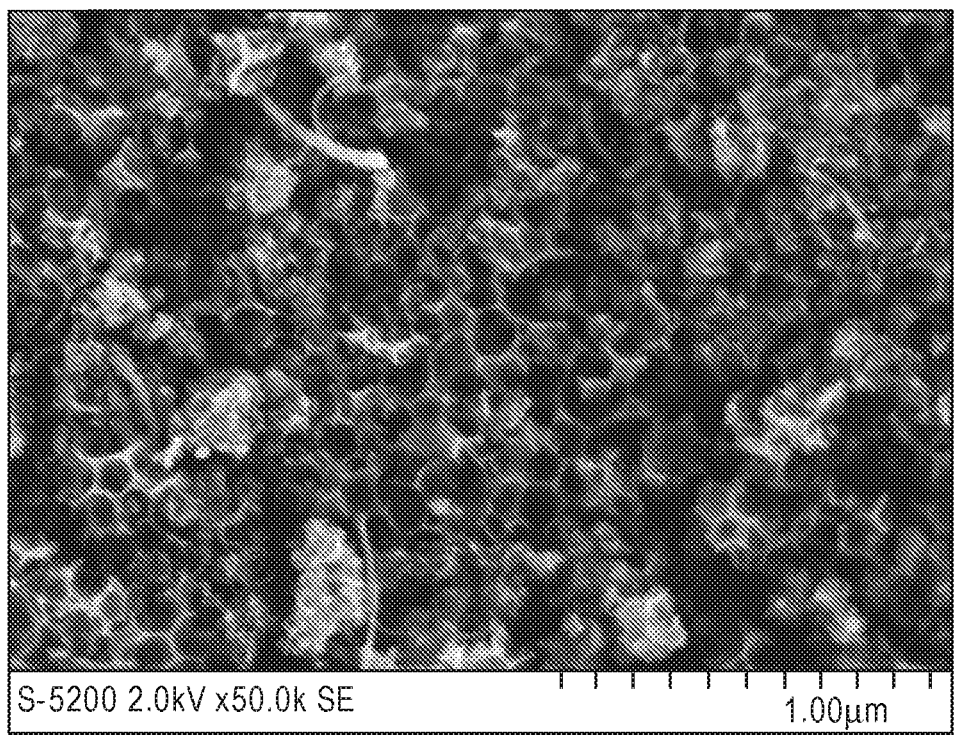
FIG. 3. is an SEM image of catalyst prepared using the sacrificial support based method with small amount of Stober glasses.
Figure 4:
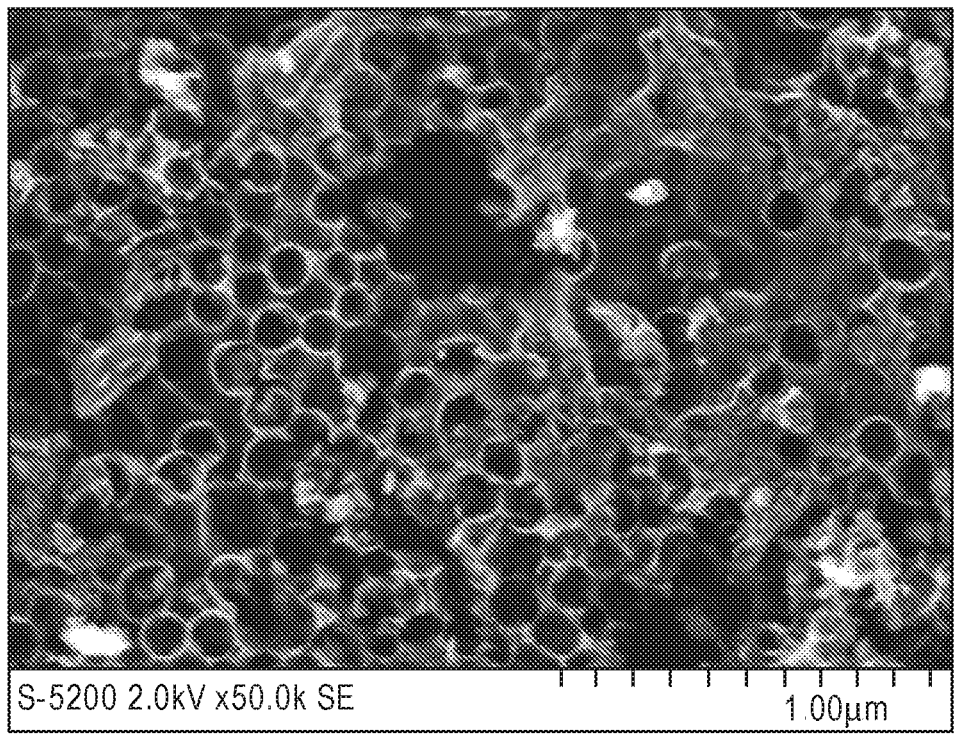
FIG. 4 is an SEM image of catalyst prepared using the sacrificial support based method with medium amount of Stober glasses.
Figure 5:
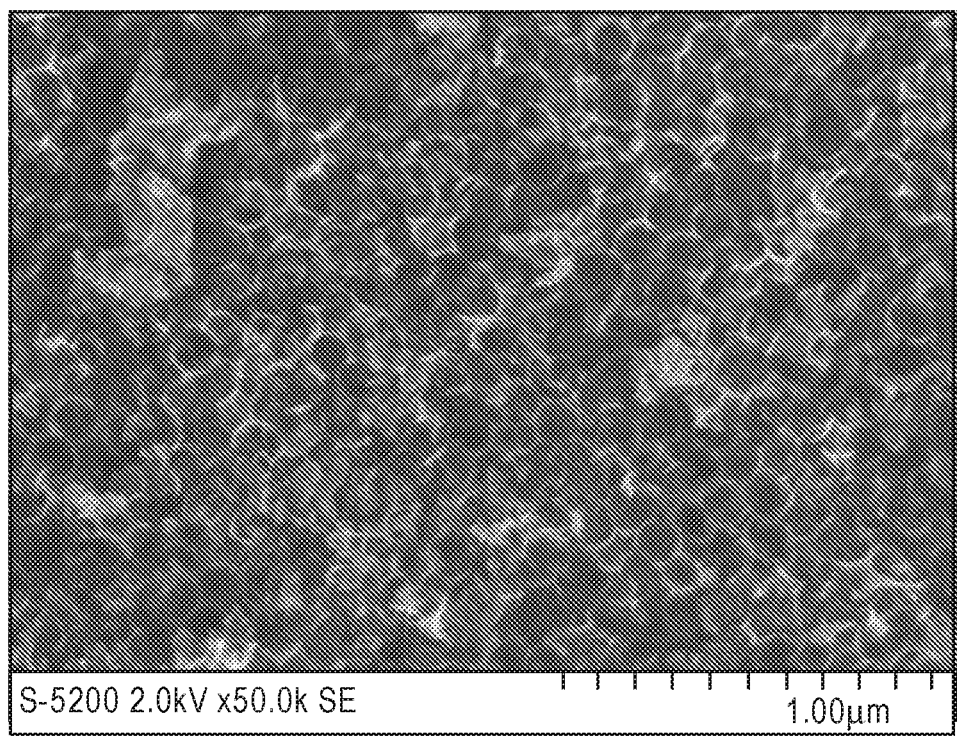
FIG. 5 is an SEM image of catalyst prepared using the sacrificial support based method with large amount of Stober glasses.

Platinum Metal Group Free M-N—C Catalysts Based SMART MEA.
Design of Catalytic Layer Through Catalysts Morphology Design Overall Synthetic Approach:

Fe—N—C catalysts were prepared as follows: First, a calculated amount of silica (Stöber spheres synthesized in-house with a diameter of 370 nm plus Cab-O-Sil® LM-150 and OX-50) was combined with multi-wall carbon nanotubes (Cheaptubes® 30-50 nm x 10-20 µm), iron nitrate (Fe(NO3)3*9H2O, Sigma-Aldrich) and nicarbazin (1,3-bis (4-nitrophenyl)urea; 4,6-dimethyl-1H-pyrimidin-2-one, Sigma-Aldrich). These reagents were mixed with just enough water to wet the powder. The resulting viscous gel was dried on a stir plate at 45° C. and 300 RPM overnight. The dried solid solution was placed in an 85° C. oven overnight to complete the drying process. The resulting solid material was ground to a coarse powder in an agate mortar, then to a fine powder in an agate ball mill at 50 Hz for 10 minutes. This powder was then subjected to heat treatment (HT) in a controlled atmosphere. The general conditions of HT were 7% H2/93% N2 (flow rate 120 cc min-1), inserted in a 525° C. furnace, brought up to 900° C. as quickly as possible, then brought up to 975° C. at a rate of 10° C. min-1. The temperature was held at 975° C. for 45 minutes, then the catalyst was quenched by removing the tube from the furnace. After heat treatment, the sample was ground in an agate ball mill for 10 minutes at 50 Hz. Then the silica was leached by means of a 2:1 mixture of 25% HF:35% HNO3 for 3 days. Finally Iron-Nicarbazin catalysts were washed with DI water until neutral pH and dried at T=85° C. overnight. A second heat treatment was performed at T=950° C. for 30 minutes in reactive (7% NH3/93% N2) atmospheres. The final product was ground in an agate ball mill for 1 hour at 50 Hz. Various samples (described specifically below as samples N2-N15 were prepared by varying factors such as the size of the sacrificial silica spheres (Stöber), presence or absence of CNT additives, amount of Fe(NO3)3*9H2O, and heat treatment regimes to produce catalysts that vary in surface area, pore size, and catalytic activity. FIGS. 3-5 show the morphology of Fe—N—C Catalyst produced as described herein using a small amount (FIG. 3), medium amount (FIG. 4) and large amount (FIG. 5) of Stöber silica spheres.

Fe—N—C Catalyst N2

Figure 6:
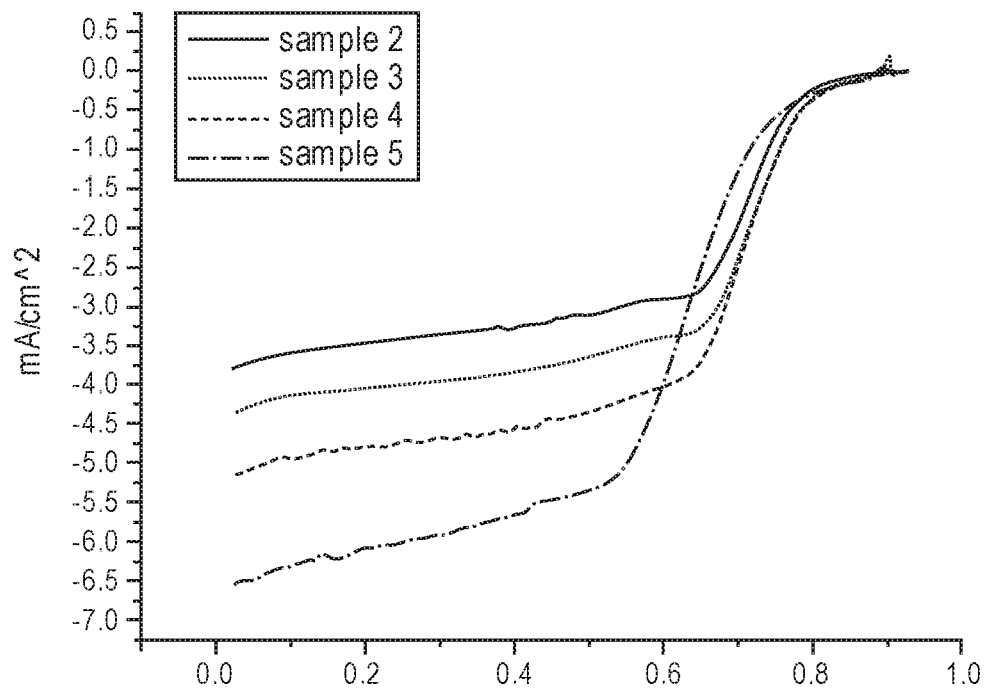
FIG. 6 is Rotating Disk Electrode (RDE) data for the oxygen reduction reaction (ORR) in acidic media for catalysts N2, N3, N4, and N5.
Figure 11:
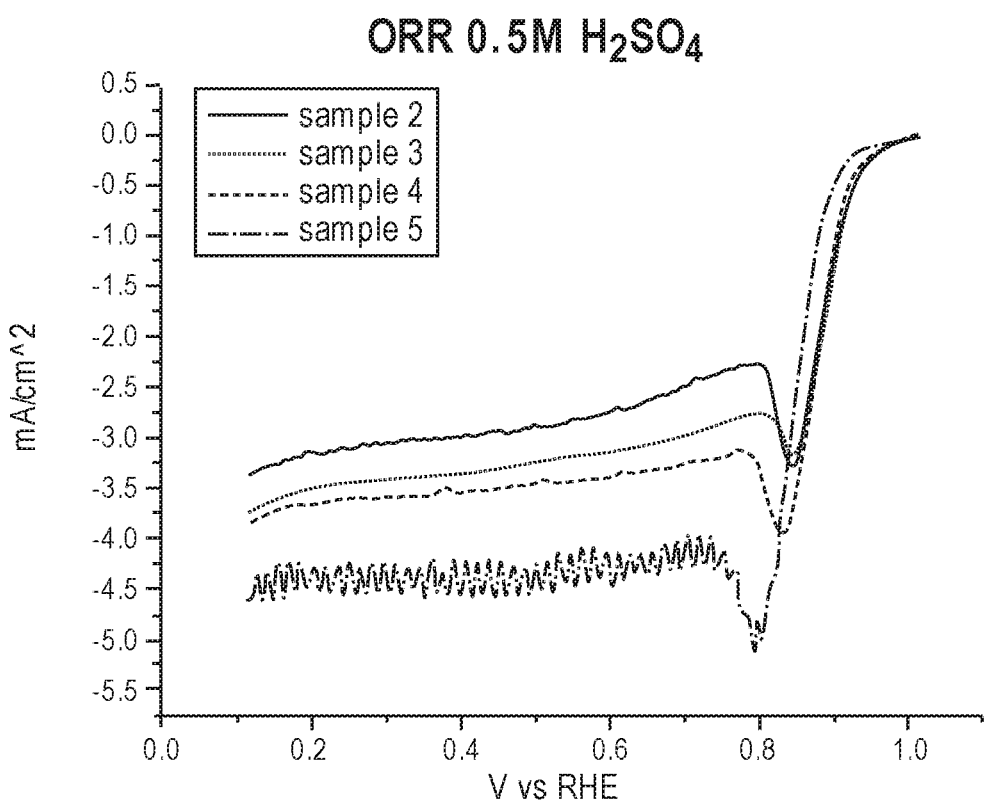
FIG. 11 is RDE data for ORR in alkaline media for catalysts N2, N3, N4, and N5.
Figure 16:
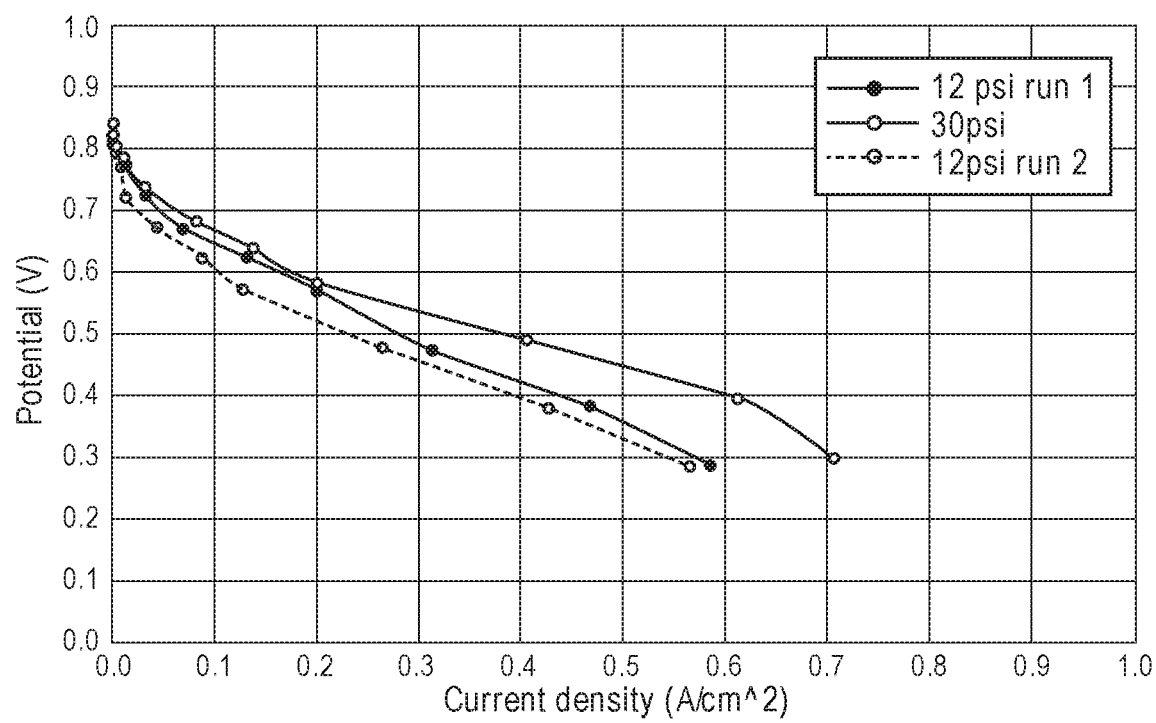
FIG. 16 shows MEA data for catalyst N2 in a proton exchange membrane configuration at 3 different pressures of air.
Figures 28, 29:
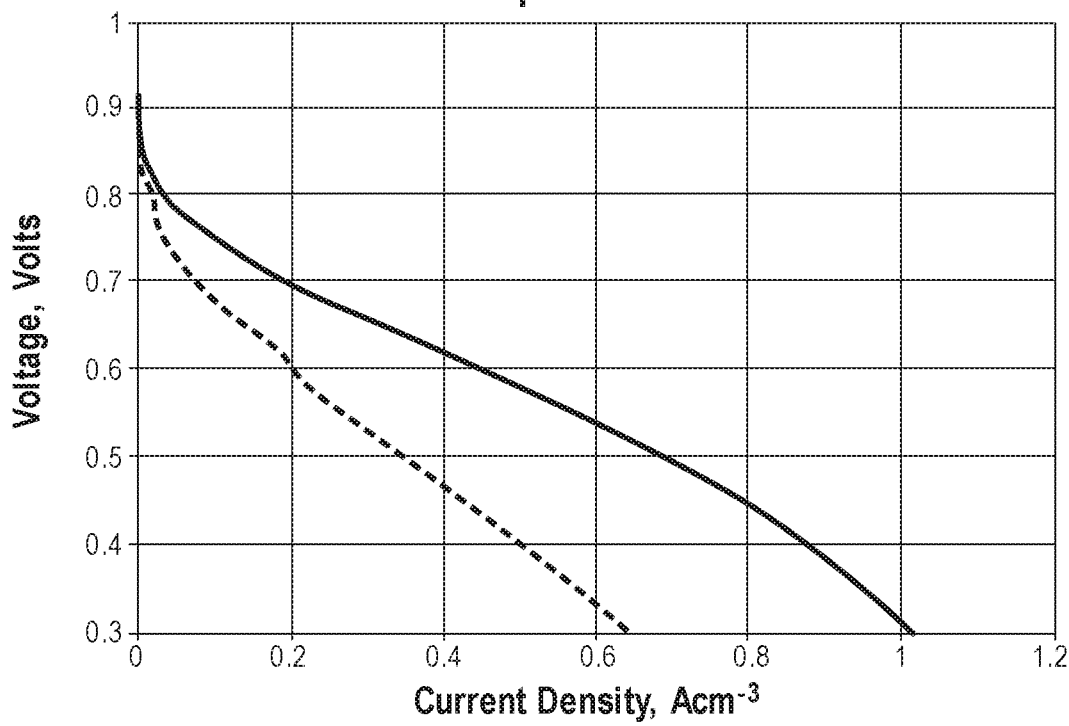
FIG. 28 is a graph showing the BET surface area of the various catalysts.
FIG. 29 shows the performance of a smart MEA according to the present disclosure formed from a first layer including catalyst N12 with 45 wt percent ionomer deposited on the surface of the membrane and a second layer including catalyst N8 with 35 wt percent ionomer deposited on the gas diffusion layer compared to a convention design composed of a single layer of catalyst in 35 wt % ionomer.

Rotating Disk Electrode (RDE) data for the oxygen reduction reaction (ORR) in acidic media for Catalyst N2 is shown in FIG. 6. Performance characteristics extracted from the RDE data are shown in the table in FIG. 10. RDE data for ORR in alkaline media for this catalyst is shown in FIG. 11, while performance characteristics extracted from the RDE data are shown in the table in FIG. 15. FIG. 16. shows MEA data for catalyst N2 in a proton exchange membrane configuration at 3 different pressures of air. FIG. 28 is a graph showing the BET surface area of the various catalysts.

Experimental Parameters for Sample N2:
LM-150: 2.5 g
OX-50: 2.5 g
Stöber: 1.0 g
CNT: 1.0 g
NCB: 12.5 g
Fe(NO3)3: 1.2 g
Heat Treatment 1 (method): 975° C. 45 min, quench
Heat Treatment 1 (gas): H2/N2 7%/93%
Etchant: HF/HNO3
Heat Treatment 2 (method): 950° C. 30 min, quench
Heat Treatment 2 (gas) NH3

Fe—N—C Catalyst N3

Figure 17:
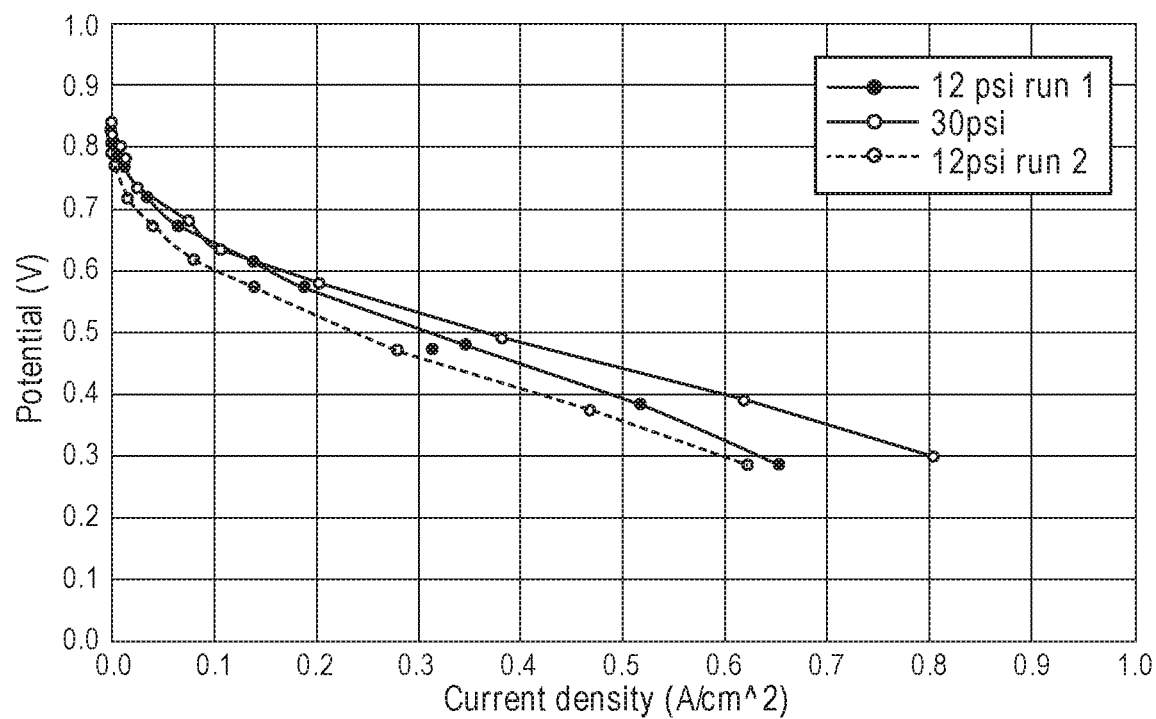
FIG. 17 shows MEA data for catalyst N3 in a proton exchange membrane configuration at 3 different pressures of air.

RDE data for ORR in acidic media for Catalyst N3 is shown in FIG. 6. Performance characteristics extracted from the RDE data are shown in the table in FIG. 10. RDE data for ORR in alkaline media for this catalyst is shown in FIG. 11, while performance characteristics extracted from the RDE data are shown in the table in FIG. 15. FIG. 17 shows MEA data for catalyst N3 in a proton exchange membrane configuration at 3 different pressures of air. The surface area of this catalyst is shown in the table in FIG. 28.

Experimental Parameters for Sample N2:
LM-150: 2.5 g
OX-50: 2.5 g
Stöber: 1.0 g
CNT: 1.0 g
NCB: 12.5 g
Fe(NO3)3: 1.2 g
Heat Treatment 1 (method): 975° C. 45 min, −25/min
Heat Treatment 1 (gas): H2/N2 7%/93%
Etchant: HF/HNO3
Heat Treatment 2 (method): 950° C. 30 min, quench
Heat Treatment 2 (gas) NH3

Fe—N—C Catalyst N4

Figure 18:
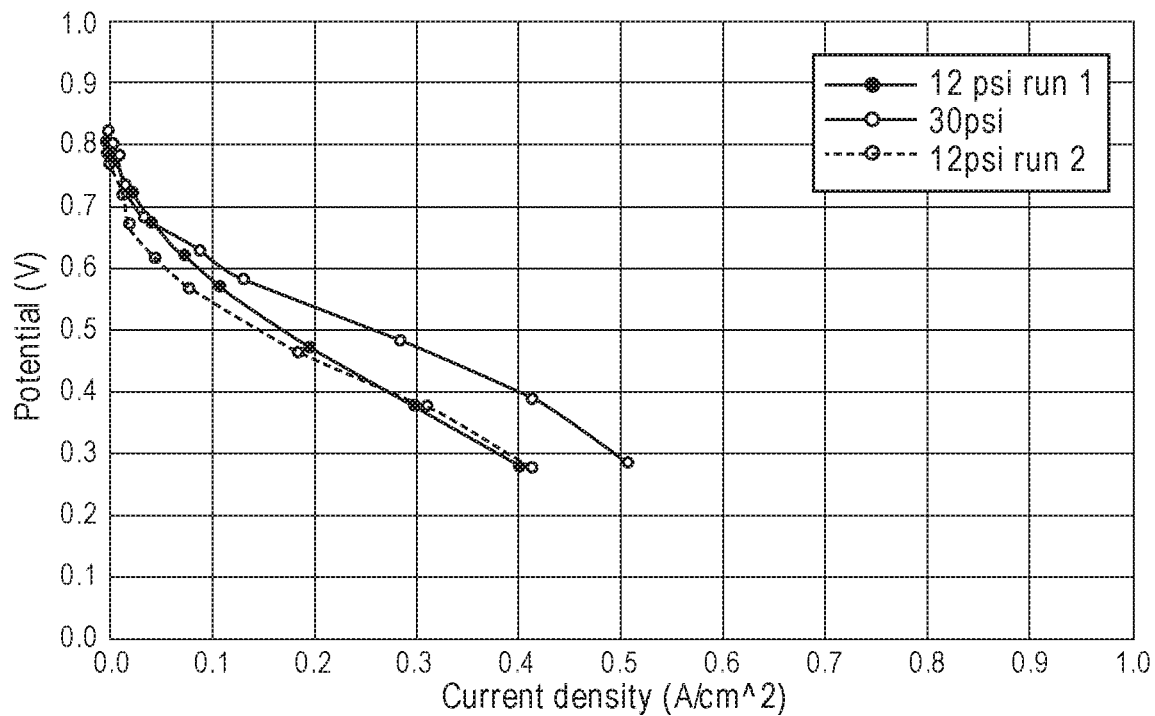
FIG. 18 shows MEA data for catalyst N4 in a proton exchange membrane configuration at 3 different pressures of air.

RDE data for ORR in acidic media for Catalyst N4 is shown in FIG. 6. Performance characteristics extracted from the RDE data are shown in the table in FIG. 10. RDE data for ORR in alkaline media for this catalyst is shown in FIG. 11, while performance characteristics extracted from the RDE data are shown in the table in FIG. 15. FIG. 18 shows MEA data for catalyst N4 in a proton exchange membrane configuration at 3 different pressures of air. The surface area of this catalyst is shown in the table in FIG. 28.

Experimental Parameters for Sample N4:
LM-150: 2.5 g
OX-50: 2.5 g
Stöber: 1.0 g
CNT: 1.0 g
NCB: 12.5 g
Fe(NO3)3: 1.2 g
Heat Treatment 1 (method): 900° C.-→975° C. 45 min, quench
Heat Treatment 1 (gas): H2/N2 7%/93%
Etchant: HF/HNO3
Heat Treatment 2 (method): 950° C. 30 min, quench
Heat Treatment 2 (gas) NH3

Fe—N—C Catalyst N5

RDE data for ORR in acidic media for Catalyst N5 is shown in FIG. 6. Performance characteristics extracted from the RDE data are shown in the table in FIG. 10. RDE data for ORR in alkaline media for this catalyst is shown in FIG. 11, while performance characteristics extracted from the RDE data are shown in the table in FIG. 15. The surface area of this catalyst is shown in the table in FIG. 28.

Experimental Parameters for Sample N5:
LM-150: 2.5 g
OX-50: 2.5 g
Stöber: 1.0 g
CNT: None
NCB: 12.5 g
Fe(NO3)3: 12.7 g
Heat Treatment 1 (method): 975° C. 45 min, quench
Heat Treatment 1 (gas): H2/N2 7%/93%
Etchant: HF
Heat Treatment 2 (method): 950° C. 45 min, quench
Heat Treatment 2 (gas) H2/N2 7%/93%

Fe—N—C Catalyst N6

Figure 7:
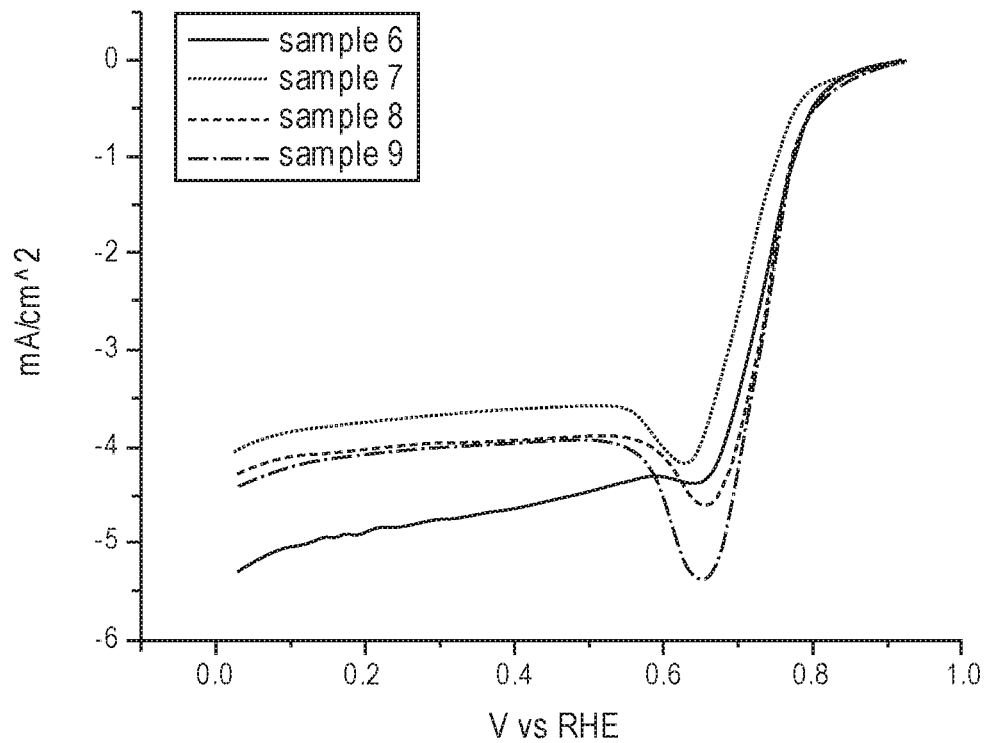
FIG. 7 is Rotating Disk Electrode (RDE) data for the oxygen reduction reaction (ORR) in acidic media for catalysts N6, N7, N8, and N9.
Figure 12:
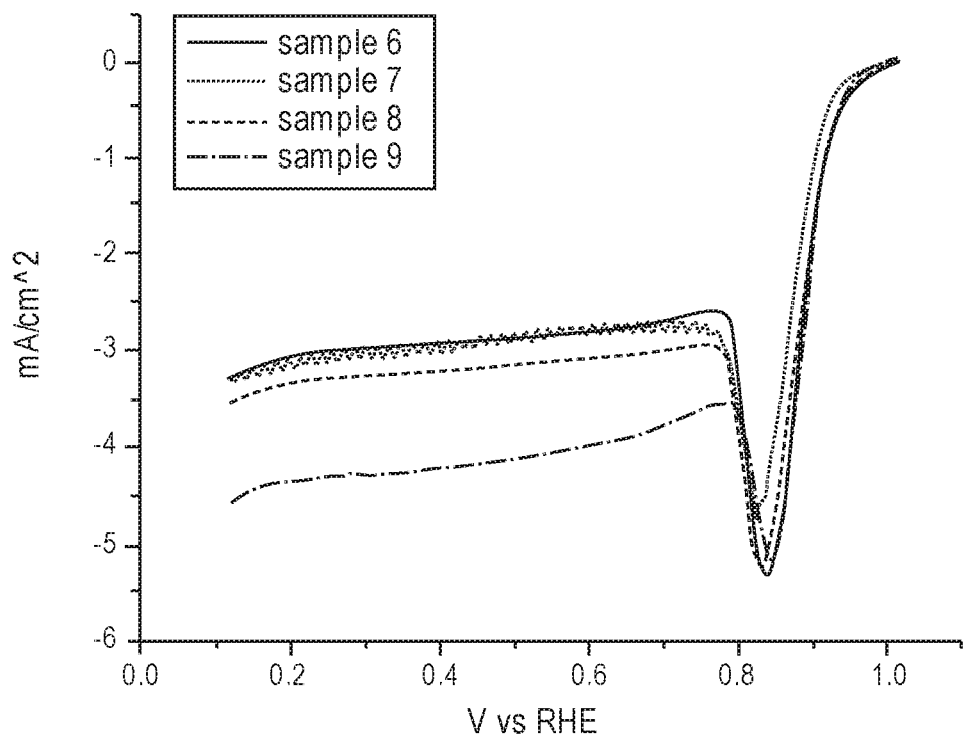
FIG. 12 is RDE data for ORR in alkaline media for catalysts N6, N7, N8, and N9.

RDE data for ORR in acidic media for Catalyst N6 is shown in FIG. 7. Performance characteristics extracted from the RDE data are shown in the table in FIG. 10. RDE data for ORR in alkaline media for this catalyst is shown in FIG. 12, while performance characteristics extracted from the RDE data are shown in the table in FIG. 15. The surface area of this catalyst is shown in the table in FIG. 28.

Experimental Parameters for Sample N6:
LM-150: 2.5 g
OX-50: 2.5 g
Stöber: 5.0 g
CNT: None
NCB: 12.5 g
Fe(NO3)3: 1.2 g
Heat Treatment 1 (method): 975° C. 45 min, quench
Heat Treatment 1 (gas): H2/N2 7%/93%
Etchant: HF
Heat Treatment 2 (method): 950° C. 45 min, quench
Heat Treatment 2 (gas) H2/N2 7%/93%

Fe—N—C Catalyst N7

Figure 19:
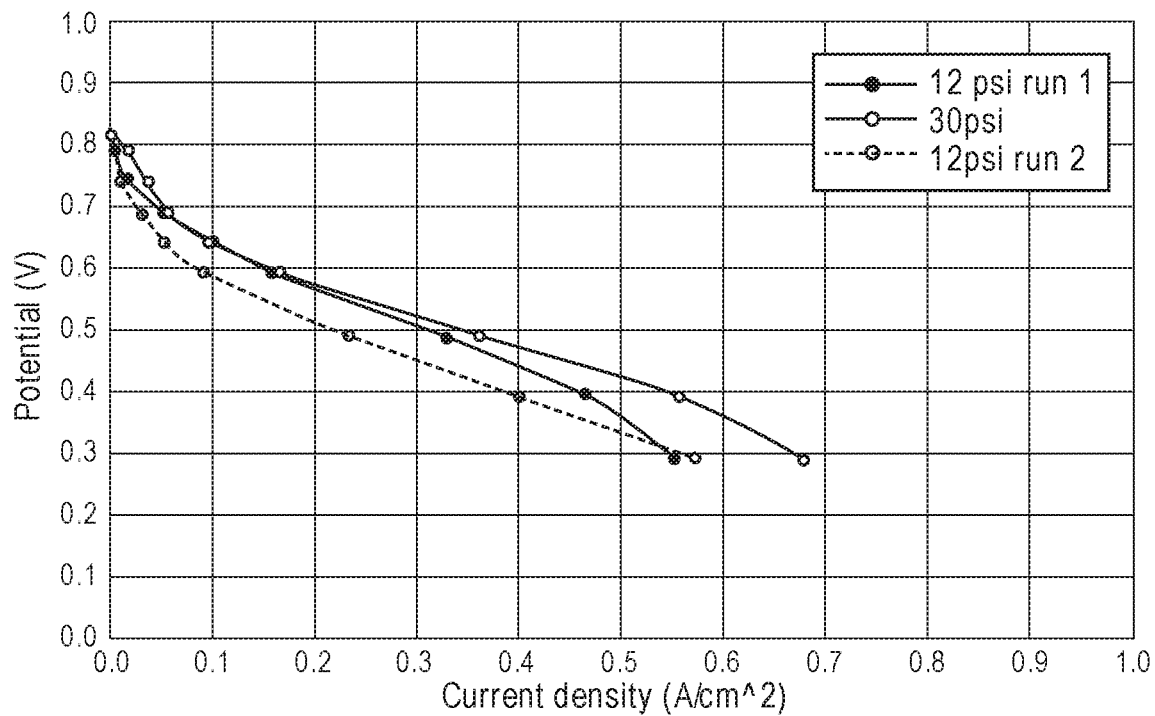
FIG. 19 shows MEA data for catalyst N7 in a proton exchange membrane configuration at 3 different pressures of air.

RDE data for ORR in acidic media for Catalyst N7 is shown in FIG. 7. Performance characteristics extracted from the RDE data are shown in the table in FIG. 10. RDE data for ORR in alkaline media for this catalyst is shown in FIG. 12, while performance characteristics extracted from the RDE data are shown in the table in FIG. 15. FIG. 19 shows MEA data for catalyst N7 in a proton exchange membrane configuration at 3 different pressures of air. The surface area of this catalyst is shown in the table in FIG. 28.

Experimental Parameters for Sample N7:
LM-150: 2.5 g
OX-50: 2.5 g
Stöber: 10.0 g CNT: None
NCB: 12.5 g
Fe(NO3)3: 1.2 g
Heat Treatment 1 (method): 975° C. 45 min, quench
Heat Treatment 1 (gas): H2/N2 7%/93%
Etchant: HF
Heat Treatment 2 (method): 950° C. 45 min, quench
Heat Treatment 2 (gas) H2/N2 7%/93%
Fe—N—C Catalyst N8

Figure 20:
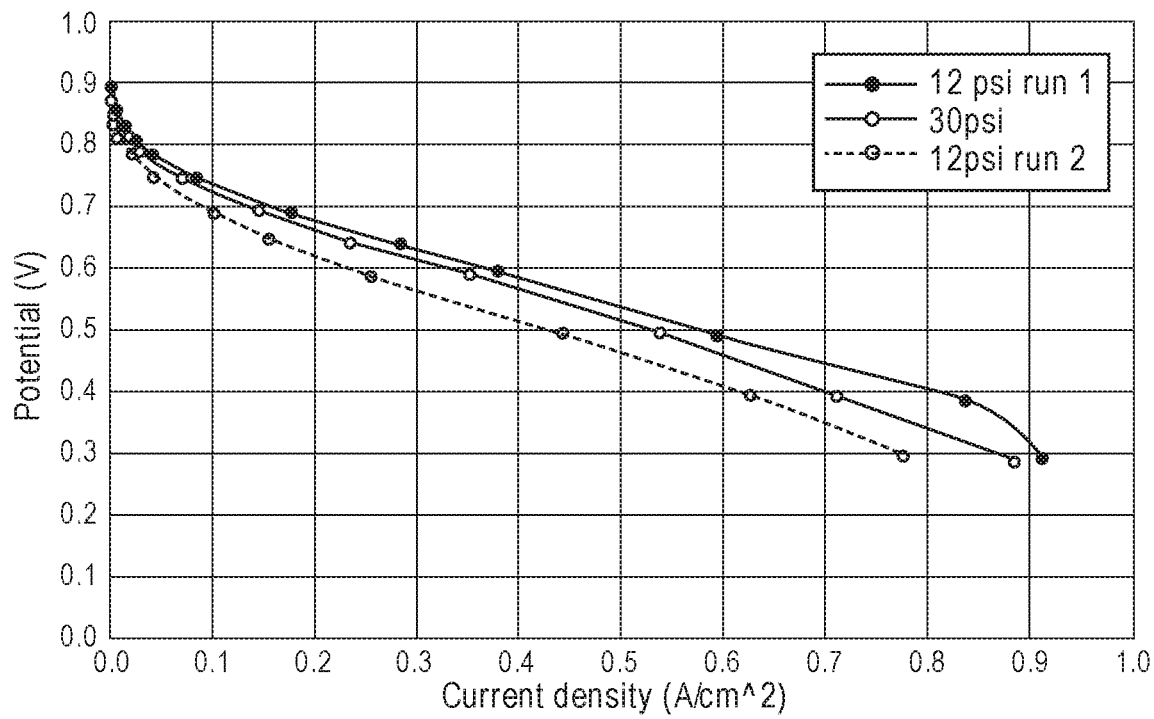
FIG. 20 shows MEA data for catalyst N8 in a proton exchange membrane configuration at 3 different pressures of air.

RDE data for ORR in acidic media for Catalyst N8 is shown in FIG. 7. Performance characteristics extracted from the RDE data are shown in the table in FIG. 10. RDE data for ORR in alkaline media for this catalyst is shown in FIG. 12, while performance characteristics extracted from the RDE data are shown in the table in FIG. 15. FIG. 20 shows MEA data for catalyst N8 in a proton exchange membrane configuration at 3 different pressures of air. The surface area of this catalyst is shown in the table in FIG. 28.

Experimental Parameters for Sample N8:
LM-150: 2.5 g
OX-50: 2.5 g
Stöber: 1.0 g
CNT: 1.0 g
NCB: 12.5 g
Fe(NO3)3: 1.2 g
Heat Treatment 1 (method): 975° C. 45 min, quench
Heat Treatment 1 (gas): H2/N2 7%/93%
Etchant: HF/HNO3
Heat Treatment 2 (method): 950° C. 30 min, quench
Heat Treatment 2 (gas): NH3
Fe—N—C Catalyst N9

Figure 21:
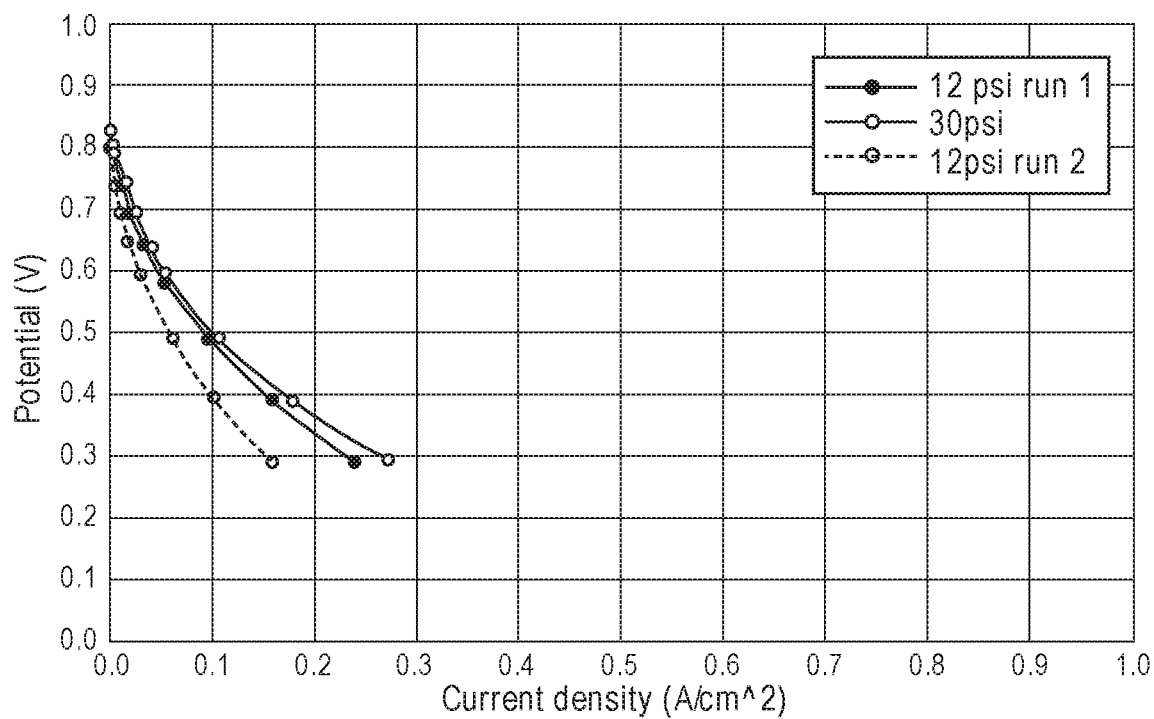
FIG. 21. Shows MEA data for catalyst N9 in a proton exchange membrane configuration at 3 different pressures of air.

RDE data for ORR in acidic media for Catalyst N9 is shown in FIG. 7. Performance characteristics extracted from the RDE data are shown in the table in FIG. 10. RDE data for ORR in alkaline media for this catalyst is shown in FIG. 12, while performance characteristics extracted from the RDE data are shown in the table in FIG. 15. FIG. 21. Shows MEA data for catalyst N9 in a proton exchange membrane configuration at 3 different pressures of air. The surface area of this catalyst is shown in the table in FIG. 28.

Experimental Parameters for Sample N9:
LM-150: 2.5 g
OX-50: 2.5 g
Stöber: 5.0 g
CNT: 1.0 g
NCB: 12.5 g
Fe(NO3)3: 1.2 g
Heat Treatment 1 (method): 975° C. 45 min, quench
Heat Treatment 1 (gas): H2/N2 7%/93%
Etchant: HF/HNO3
Heat Treatment 2 (method): 950° C. 30 min, quench
Heat Treatment 2 (gas): NH3
Fe—N—C Catalyst N10

Figure 8:
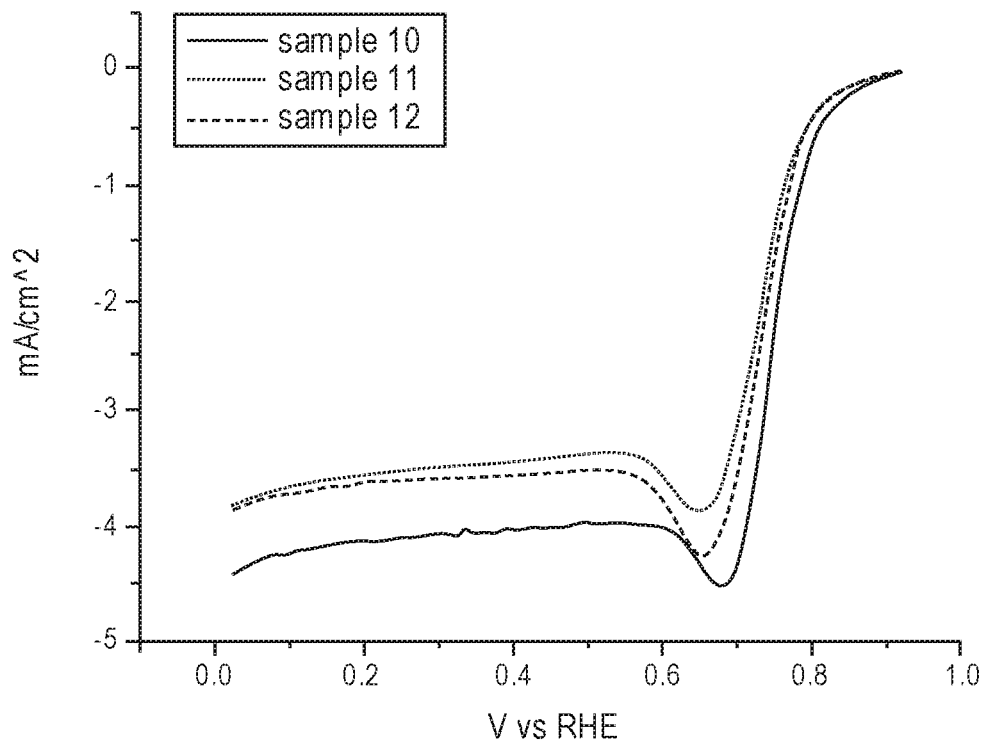
FIG. 8 is Rotating Disk Electrode (RDE) data for the oxygen reduction reaction (ORR) in acidic media for catalysts N10, N11 and N12.
Figure 13:
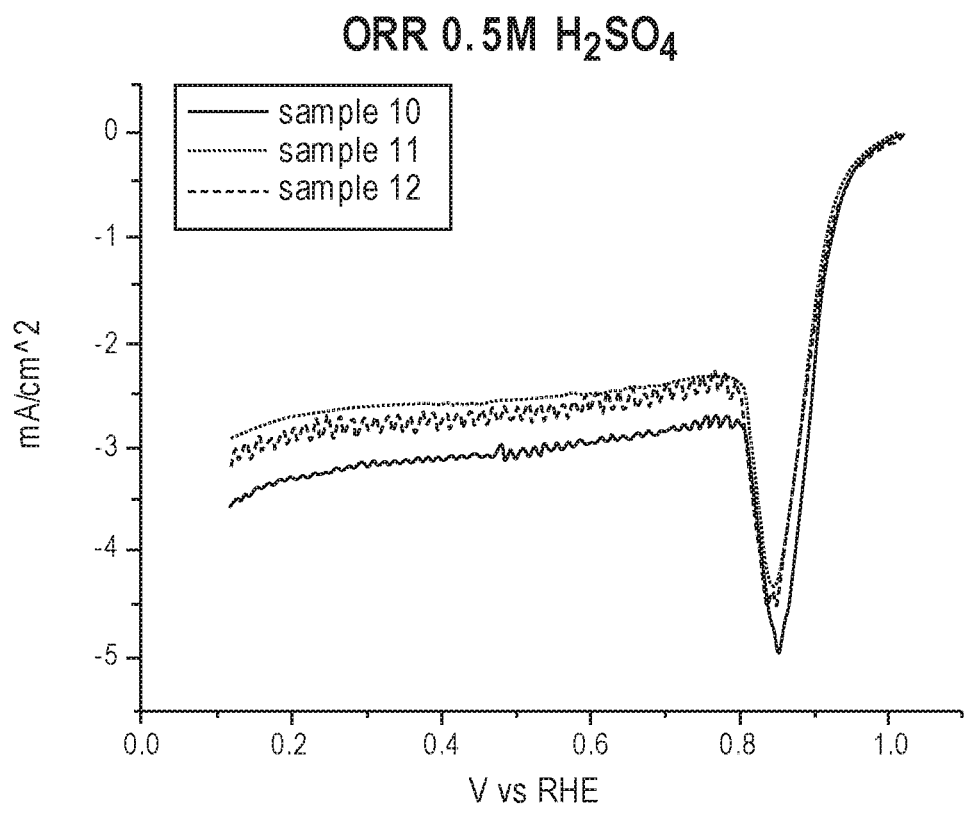
FIG. 13 is RDE data for ORR in alkaline media for catalysts N10, N11, and N12.
Figure 22:
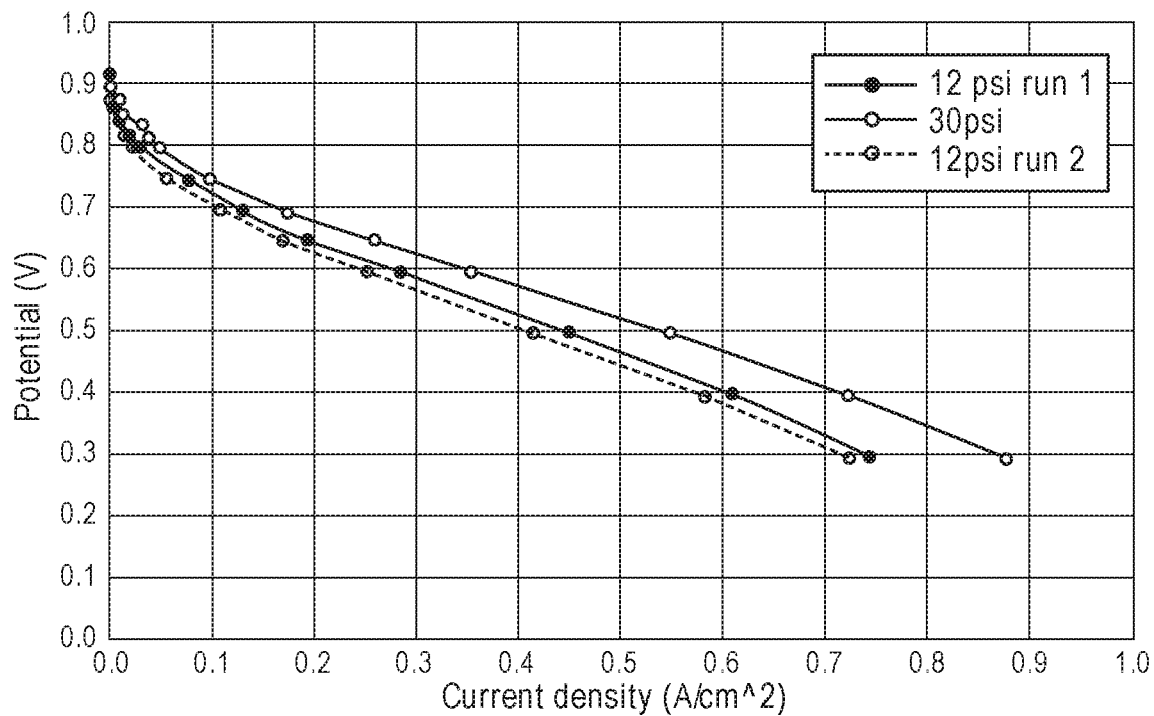
FIG. 22 shows MEA data for catalyst N10 in a proton exchange membrane configuration at 3 different pressures of air.

RDE data for ORR in acidic media for Catalyst N10 is shown in FIG. 8. Performance characteristics extracted from the RDE data are shown in the table in FIG. 10. RDE data for ORR in alkaline media for this catalyst is shown in FIG. 13, while performance characteristics extracted from the RDE data are shown in the table in FIG. 15. FIG. 22 shows MEA data for catalyst N10 in a proton exchange membrane configuration at 3 different pressures of air. The surface area of this catalyst is shown in the table in FIG. 28.

Experimental Parameters for Sample N10:
LM-150: 2.5 g
OX-50: 2.5 g
Stöber: 1.0 g
CNT: None
NCB: 12.5 g
Fe(NO3)3: 1.2 g
Heat Treatment 1 (method): 975° C. 45 min, quench
Heat Treatment 1 (gas): H2/N2 7%/93%
Etchant: HF/HNO3
Heat Treatment 2 (method): 950° C. 30 min, quench
Heat Treatment 2 (gas): NH3
Fe—N—C Catalyst N11

Figure 23:
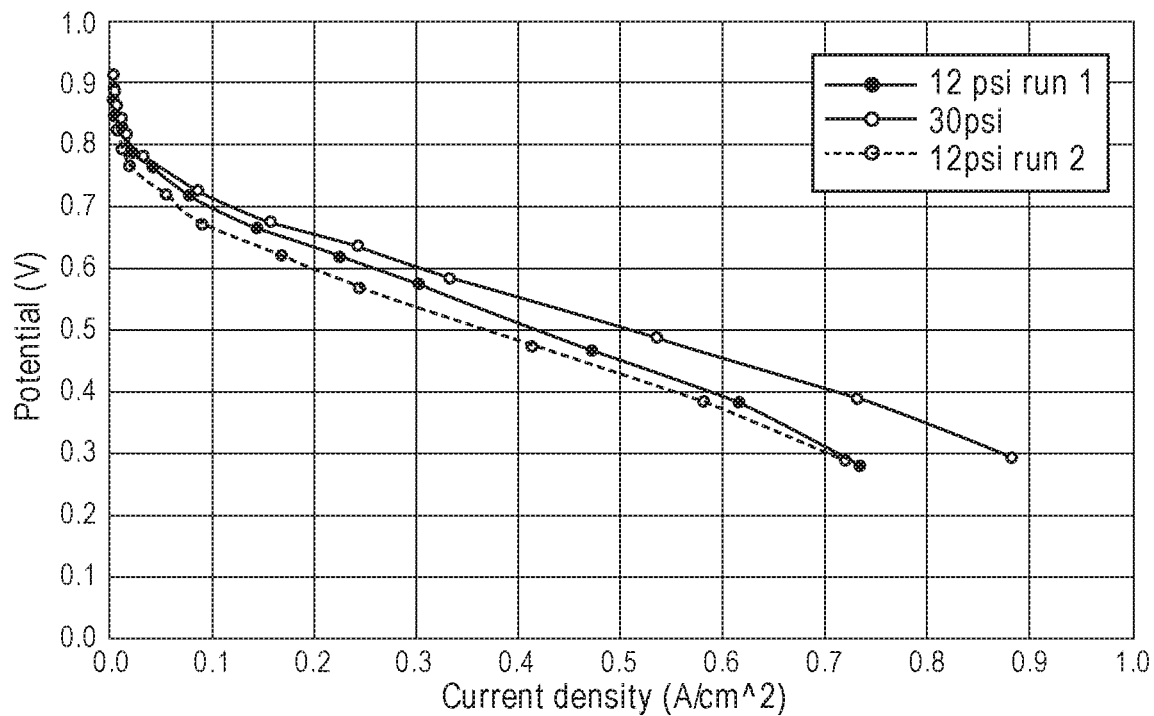
FIG. 23 shows MEA data for catalyst N11 in a proton exchange membrane configuration at 3 different pressures of air.

RDE data for ORR in acidic media for Catalyst N11 is shown in FIG. 8. Performance characteristics extracted from the RDE data are shown in the table in FIG. 10. RDE data for ORR in alkaline media for this catalyst is shown in FIG. 13, while performance characteristics extracted from the RDE data are shown in the table in FIG. 15. FIG. 23 shows MEA data for catalyst N11 in a proton exchange membrane configuration at 3 different pressures of air. The surface area of this catalyst is shown in the table in FIG. 28.

Experimental Parameters for Sample N11:
LM-150: 2.5D g
OX-50: 2.5 g
Stöber: 1.0 g
CNT: None
NCB: 12.5 g
Fe(NO3)3: 1.2 g
Heat Treatment 1 (method): 975° C. 45 min, quench
Heat Treatment 1 (gas): H2/N2 7%/93%
Etchant: HF
Heat Treatment 2 (method): 950° C. 30 min, quench
Heat Treatment 2 (gas): NH3
Fe—N—C Catalyst N12

Figure 24:
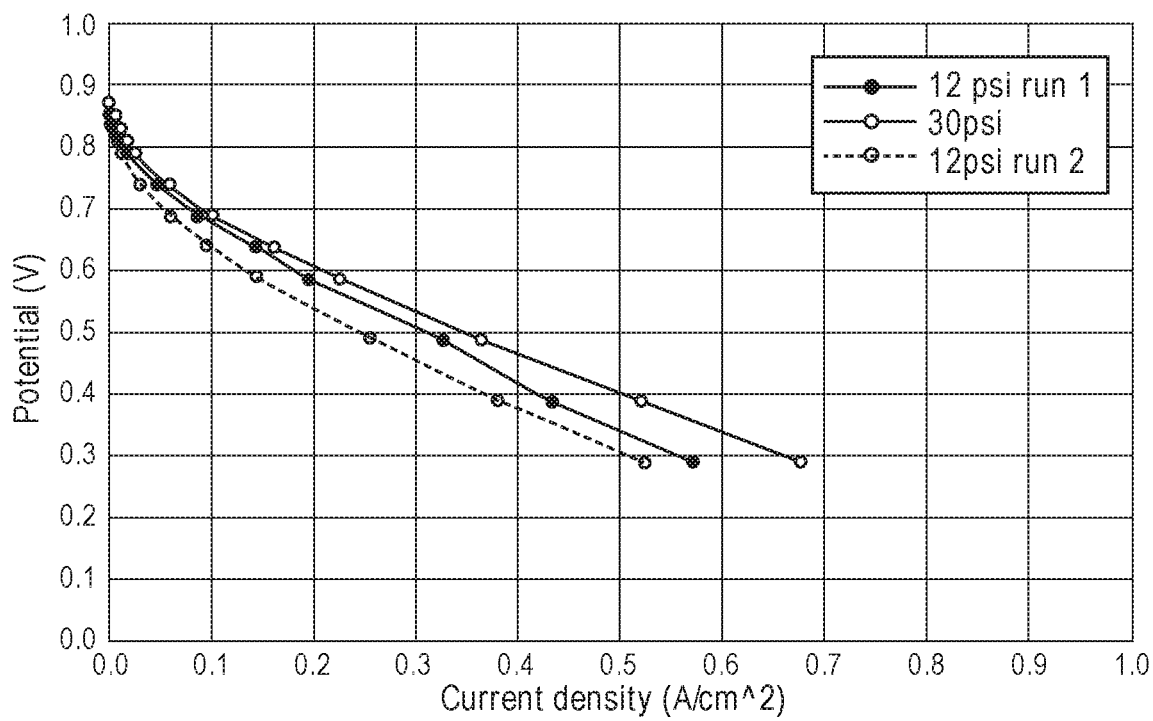
FIG. 24 shows MEA data for catalyst N12 in a proton exchange membrane configuration at 3 different pressures of air.

RDE data for ORR in acidic media for Catalyst N12 is shown in FIG. 8. Performance characteristics extracted from the RDE data are shown in the table in FIG. 10. RDE data for ORR in alkaline media for this catalyst is shown in FIG. 13, while performance characteristics extracted from the RDE data are shown in the table in FIG. 15. FIG. 24 shows MEA data for catalyst N12 in a proton exchange membrane configuration at 3 different pressures of air. The surface area of this catalyst is shown in the table in FIG. 28.

Experimental Parameters for Sample N12:
LM-150: 2.5D g
OX-50: 2.5 g
Stöber: 1.0 g
CNT: 1.0 g
NCB: 12.5 g
Fe(NO3)3: 1.2 g
Heat Treatment 1 (method): 975° C. 45 min, quench
Heat Treatment 1 (gas): H2/N2 7%/93%
Etchant: HF/HNO3
Heat Treatment 2 (method): 950° C. 45 min, quench
Heat Treatment 2 (gas): NH3
Fe—N—C Catalyst N13

Figure 9:
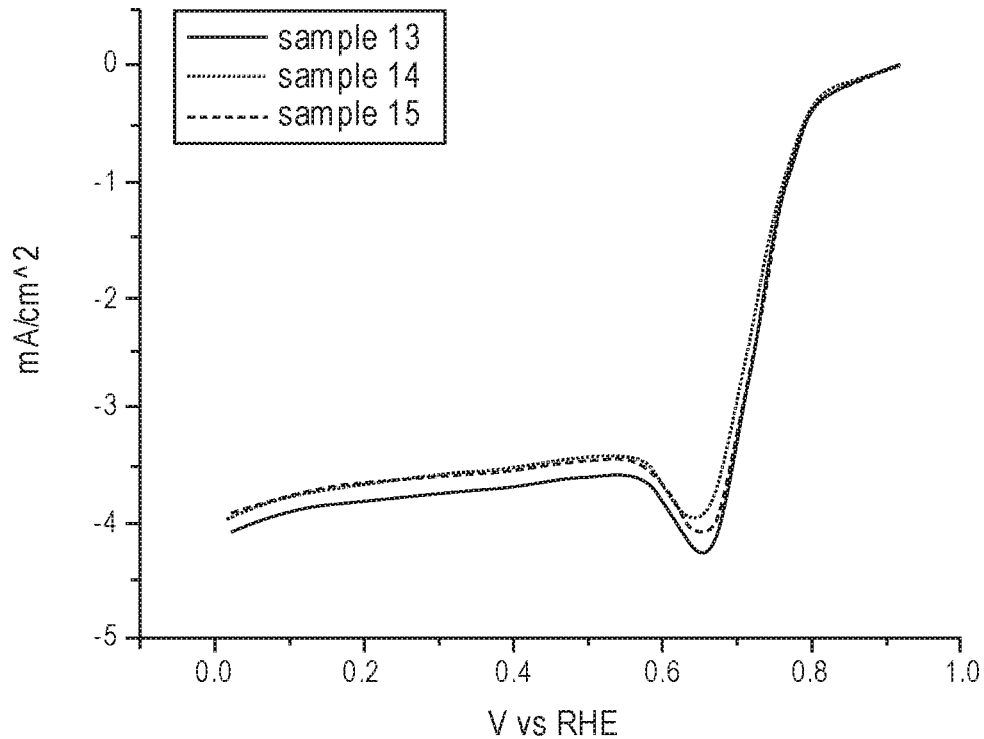
FIG. 9 is Rotating Disk Electrode (RDE) data for the oxygen reduction reaction (ORR) in acidic media for catalysts N13, N14, and N15.
Figure 14:
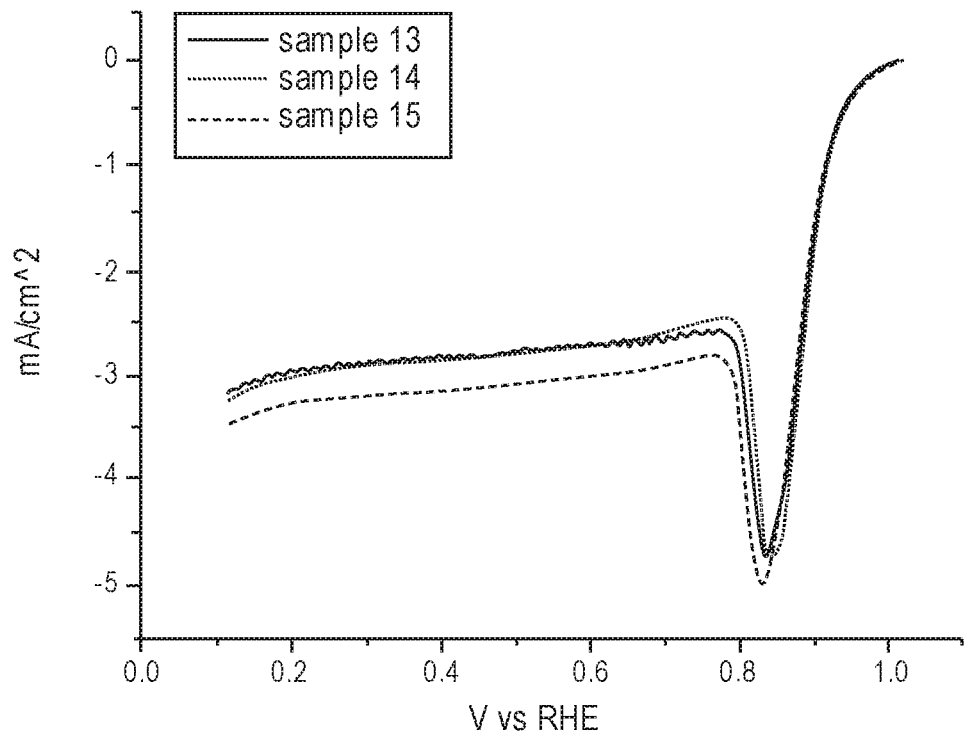
FIG. 14 is RDE data for ORR in alkaline media for catalysts N13, N14, and N15.
Figure 25:
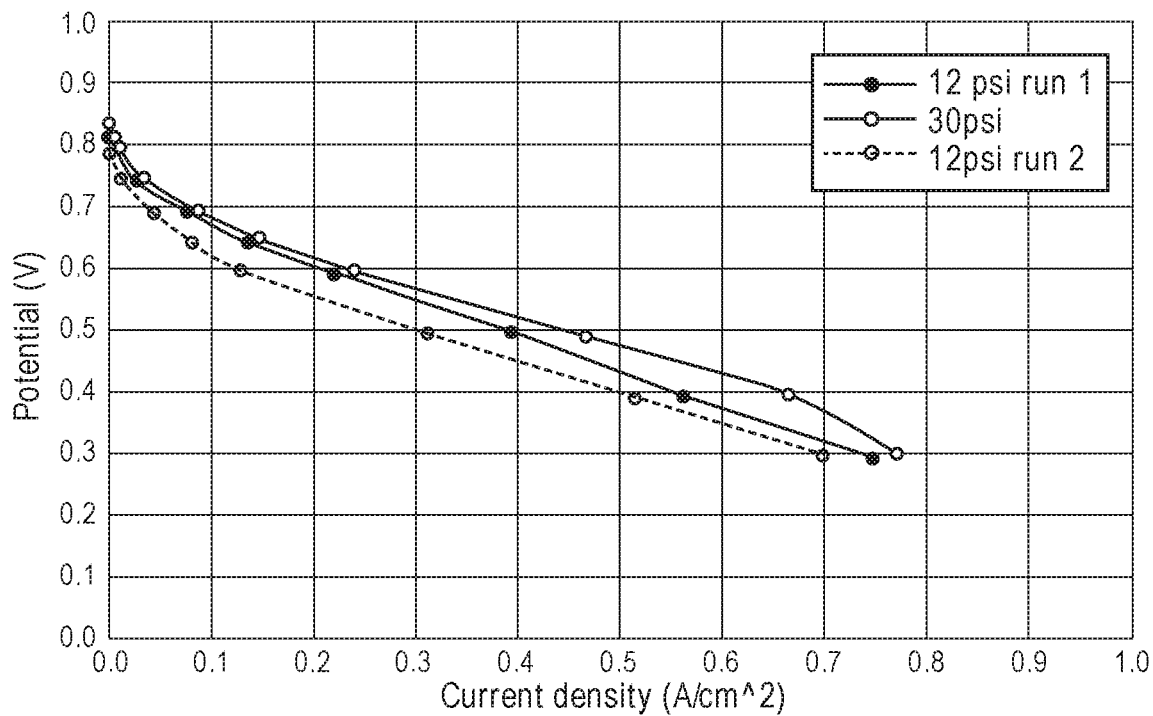
FIG. 25 shows MEA data for catalyst N13 in proton exchange membrane configuration at 3 different pressures of air.

RDE data for ORR in acidic media for Catalyst N13 is shown in FIG. 9. Performance characteristics extracted from the RDE data are shown in the table in FIG. 10. RDE data for ORR in alkaline media for this catalyst is shown in FIG. 14, while performance characteristics extracted from the RDE data are shown in the table in FIG. 15. FIG. 25 shows MEA data for catalyst N13 in proton exchange membrane configuration at 3 different pressures of air. The surface area of this catalyst is shown in the table in FIG. 28.

Experimental Parameters for Sample N13:
LM-150: 2.5D g
OX-50: 2.5 g
Stöber: 1.0 g
CNT: 1.0 g
NCB: 12.5 g Fe(NO3)3: 1.2 g
Heat Treatment 1 (method): 975° C. 45 min, quench
Heat Treatment 1 (gas): H2/N2 7%/93%
Etchant: HF/HNO3
Heat Treatment 2 (method): 950° C. 45 min, quench
Heat Treatment 2 (gas) H2/N2 7%/93%
Fe—N—C Catalyst N14

Figure 26:
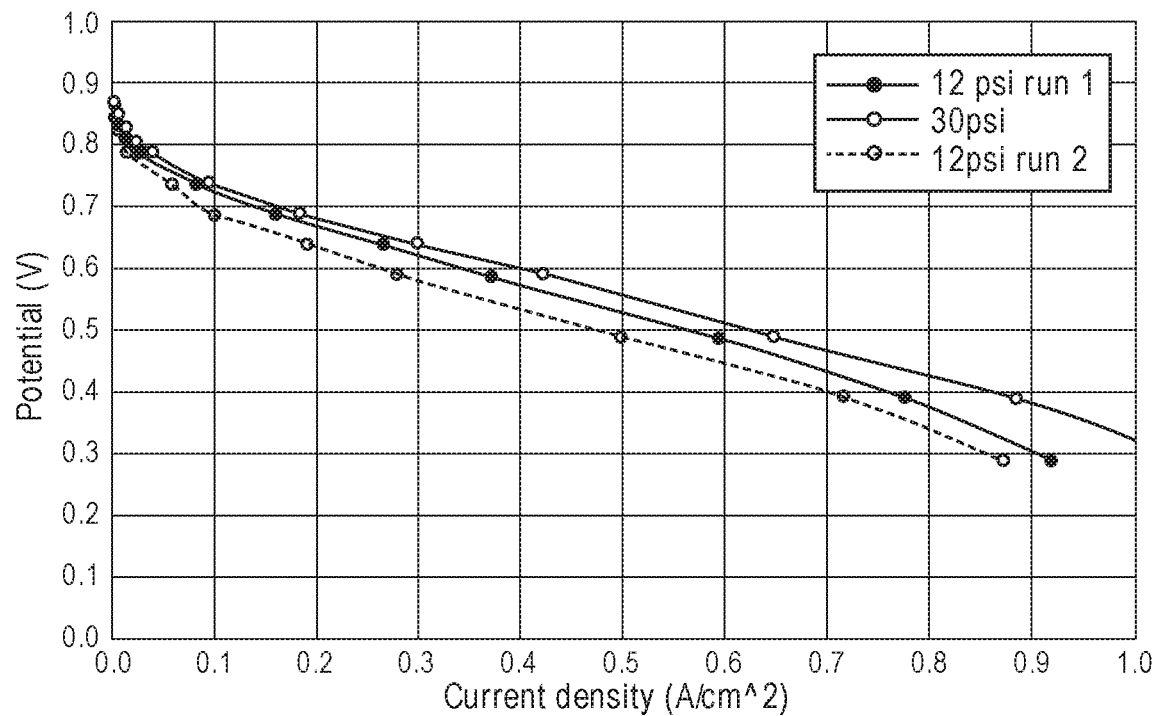
FIG. 26 shows MEA data for catalyst N14 in a proton exchange membrane configuration at 3 different pressures of air.

RDE data for ORR in acidic media for Catalyst N14 is shown in FIG. 9. Performance characteristics extracted from the RDE data are shown in the table in FIG. 10. RDE data for ORR in alkaline media for this catalyst is shown in FIG. 14, while performance characteristics extracted from the RDE data are shown in the table in FIG. 15. FIG. 26 shows MEA data for catalyst N14 in a proton exchange membrane configuration at 3 different pressures of air. The surface area of this catalyst is shown in the table in FIG. 28.

Experimental Parameters for Sample N14:
LM-150: 2.5D g
OX-50: 2.5 g
Stöber: 1.0 g
CNT: 1.0 g
NCB: 12.5 g
Fe(NO3)3: 1.2 g
Heat Treatment 1 (method): 975° C. 45 min, quench
Heat Treatment 1 (gas): H2/N2 7%/93%
Etchant: HF
Heat Treatment 2 (method): 950° C. 30 min, quench
Heat Treatment 2 (gas): NH3
Fe—N—C Catalyst N15

Figure 27:
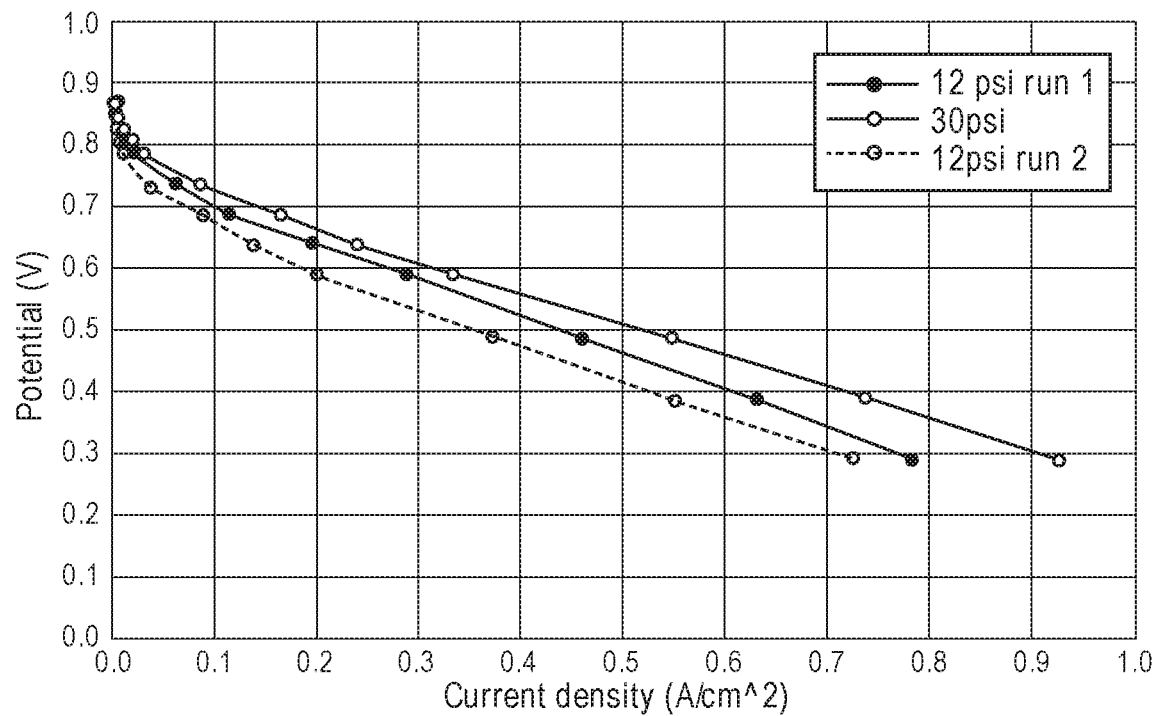
FIG. 27 shows MEA data for catalyst N15 in proton exchange membrane configuration at 3 different pressures of air.

RDE data for ORR in acidic media for Catalyst N15 is shown in FIG. 9. Performance characteristics extracted from the RDE data are shown in the table in FIG. 10. RDE data for ORR in alkaline media for this catalyst is shown in FIG. 14, while performance characteristics extracted from the RDE data are shown in the table in FIG. 15. FIG. 27 shows MEA data for catalyst N15 in proton exchange membrane configuration at 3 different pressures of air. The surface area of this catalyst is shown in the table in FIG. 28.

Experimental Parameters for Sample N15:
LM-150: 2.5D g
OX-50: 2.5 g
Stöber: 1.0 g
CNT: 1.0 g
NCB: 12.5 g
Fe(NO3)3: 1.2 g
Heat Treatment 1 (method): 975° C. 45 min, quench
Heat Treatment 1 (gas): H2/N2 7%/93%
Etchant: HF/HNO3
Heat Treatment 2 (method): 950° C. 45 min, quench
Heat Treatment 2 (gas): NH3

Smart MEA

Based on the performance characteristics of the above-described samples, a Smart MEA for use in a polymer exchange fuel cell operated with air as an oxygen source and utilizing platinum free Fe—N—C catalysts was designed. Layer 1L included catalyst N12 with 45 wt percent ionomer and was deposited on the surface of the membrane (CCM) with a catalyst loading of 1 mg cm$^{-1}$. This catalyst was selected due to the determination that this material will produce only 4% of $H_2O_2$ and will not negatively influence membrane stability. The surface area of this material is 660 m$^2$ g$^{-1}$ with pore size is in the range of 50 nm, which is well suitable for high ionomer loading (~45 wt %). Layer 2L included catalyst N8, with 35 wt percent ionomer. This material was deposit on the GDE. Sample N8 was selected due to the high performance in the air at potential 0.6V, which makes it an effective catalytic layer and helps to prevent water flooding in the system. The reduced amount of iomer in the second layer (the layer closest to the GDE) compared to the first layer (the layer closes to the membrane) serves to direct water towards the GDE, where it can ultimately be removed from the system. The performance of this smart MEA compared to a conventional design is shown in FIG. 29. The conventional design is a single layer of catalyst in 35 wt % ionomer applied to the GD. The performance of the Conventional MEA at 0.6V is 0.2 A cm$^{-2}$, while the performance of the SMART MEA at 0.6V is 0.44 A cm$^{-2}$, which is more that 200% improvement.

What is claimed is:

1. A multi-layered membrane electrode assembly (MEA) wherein the MEA contains at least three catalytic ink layers wherein each layer comprises a porous catalytic material formed using a sacrificial template-based technique including sacrificial template particles, wherein the pores in the catalytic material are the general shape and size of the sacrificial template particles and the overall morphology and internal structure of the catalytic material is determined by the ratio of sacrificial template particles to precursors of the catalytic material that is used when forming the porous catalytic material, and wherein each layer differs from the other layers based on the hydrophobic properties of the catalytic material in the catalytic ink so as to produce a gradient of hydrophobicity across the at least three catalytic ink layers and further wherein the catalytic layers also differ by ionomer concentration.

2. The multi-layered MEA of claim 1 wherein the MEA contains a gas diffusion layer and a membrane and the catalytic ink layers are positioned between the gas diffusion layer and the membrane and wherein the ionomer concentration in the at least three layers forms a gradient wherein the higher ionomer concentration is found closest to the membrane and the lower ionomer concentration is found closest to the gas diffusion layer.

3. The multi-layered MEA of claim 1 wherein the MEA contains a gas diffusion layer and an anion exchange membrane and the catalytic ink layers are positioned between or inside the gas diffusion layer and the anion exchange membrane and wherein the hydrophobicity in the at least three layers forms a gradient such that water in the MEA is directed away from the gas diffusion layer and towards the anion exchange membrane.

4. The multi-layered MEA of claim 1 wherein the hydrophobic properties of the catalytic materials differ due to the catalytic material composition.

5. The multi-layered MEA of claim 1 wherein the catalytic layers also differ by catalytic material concentration.

6. The multi-layered MEA of claim 1 wherein the hydrophobic properties of the catalytic materials differ due to the catalytic material morphology.

7. The multi-layered MEA of claim 1 wherein the hydrophobic properties of the catalytic materials differ due to the catalytic material surface area.

8. The multi-layered MEA of claim 1 wherein the catalytic layers also differ by the presence, concentration or morphology of an additive.

9. The multi-layered MEA of claim 8 wherein the additive is a carbon additive.

10. The multi-layered MEA of claim 1 wherein the sacrificial support-based technique comprises:
mixing metal, nitrogen, and carbon precursors with sacrificial template particles under suitable conditions such that a hybrid material containing sacrificial template particles is formed;
heat treating the hybrid material; and
removing the sacrificial template particles.

11. The multi-layered MEA of claim 1 wherein the sacrificial support-based technique comprises:
  mixing metal, nitrogen, and carbon precursors with sacrificial template particles under suitable conditions such that a hybrid material containing sacrificial template particles is formed;
  heat treating the hybrid material; and
  removing the sacrificial template particles;
  wherein the hydrophobic properties of the catalytic material in each layer is differed by altering at least one of the:
    metal, nitrogen, and carbon precursors;
    the amount, size, or shape of sacrificial template particles;
    the conditions of the heat treatment; and
    the method or removing the sacrificial particles.

12. The multi-layered MEA of claim 1, wherein the catalytic layer comprises M-N—C catalyst.

13. The multi-layered MEA of claim 1, wherein the catalytic layer comprises Fe—N—C catalyst.

14. A membrane electrode assembly (MEA) comprising a gas diffusion electrode, a membrane, and a catalytic layer positioned between or inside the gas diffusion electrode and the membrane, wherein the catalytic layer comprises a graduated ionomer concentration wherein a higher concentration of ionomer is found closest to the membrane and a lower concentration of ionomer is found closest to the gas diffusion electrode; and wherein the catalytic layer further comprises a graduated degree of hydrophobicity created by the presence of different types of porous catalytic material formed using a sacrificial support-based technique which results in different hydrophobic properties in the catalytic layer such that water in the MEA is gradually directed away from the membrane and towards the gas diffusion layer.

15. The MEA of claim 14 wherein the catalytic layer further comprises catalytic material having a higher surface area concentrated towards the gas diffusion layer and catalytic material having a lower surface area concentrated towards the membrane.

16. A membrane electrode assembly (MEA) comprising a gas diffusion electrode, a membrane, and at least three catalytic layers positioned between or inside the gas diffusion electrode and the membrane, wherein the hydrophobic properties of the catalytic layers result in a graduated degree of hydrophobicity across the catalytic layers such that water in the MEA is directed away from the membrane and towards the gas diffusion layer and wherein the MEA further comprises a graduated ionomer concentration wherein a higher concentration of ionomer is found closest to the membrane and a lower concentration of ionomer is found closest to the gas diffusion electrode,
  wherein the MEA further comprises catalytic material having a higher surface area concentrated towards the gas diffusion layer and catalytic material having a lower surface area concentrated towards the membrane.

17. A method for forming a membrane electrode assembly (MEA) comprising:
  preparing a first catalytic ink comprising a catalytic material mixed with an ionomer;
  preparing a second catalytic ink comprising a catalytic material mixed with an ionomer;
  wherein the first catalytic ink differs from the second catalytic ink by the hydrophobic properties and ionomer concentration in each layer;
  applying the first catalytic ink to a first substrate to produce a first layer; and
  applying the second catalytic ink to the first substrate over the first catalytic ink or to a second substrate to produce a second layer; and
  producing a third layer using the first, second, or a third catalytic ink, wherein the different hydrophobic properties of the catalytic material in the three layers produces a hydrophobicity gradient across the catalytic layers.

18. The method of claim 17 wherein the first substrate is a gas diffusion electrode and the second substrate is a proton or anion exchange membrane.

19. A multi-layered membrane electrode assembly (MEA) wherein the MEA contains at least two catalytic ink layers wherein each layer is formed by applying a catalytic ink comprising a catalytic material to a substrate, wherein
  the catalytic layers differ based on the hydrophobicity and surface area of the catalytic materials in each of the catalytic layers, and wherein
  the MEA contains a gas diffusion layer and a proton exchange membrane and the catalytic ink layers are positioned between or inside of the gas diffusion layer and the proton
  exchange membrane and wherein the hydrophobicity and surface area in the at least two layers
  forms a gradient such that water in the MEA is directed away from the proton exchange membrane and towards the gas diffusion layer.

* * * * *